(12) United States Patent
Matsushita et al.

(10) Patent No.: US 9,263,743 B2
(45) Date of Patent: Feb. 16, 2016

(54) ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Tadashi Matsushita, Fukushima (JP); Takaaki Matsui, Fukushima (JP); Takehiko Ishii, Fukushima (JP)

(73) Assignee: Sony Corporation, Tokyo (JP)

(*) Notice: Subject to any disclaimer, the term of this patent is extended or adjusted under 35 U.S.C. 154(b) by 131 days.

(21) Appl. No.: 13/893,834

(22) Filed: May 14, 2013

(65) Prior Publication Data
US 2013/0330623 A1 Dec. 12, 2013

(30) Foreign Application Priority Data
Jun. 7, 2012 (JP) ................................. 2012-129459
Apr. 2, 2013 (JP) ................................. 2013-076641

(51) Int. Cl.
| | |
|---|---|
| *H01M 4/13* | (2010.01) |
| *H01M 4/485* | (2010.01) |
| *H01M 4/505* | (2010.01) |
| *H01M 4/525* | (2010.01) |
| *H01M 4/131* | (2010.01) |
| *H01M 4/36* | (2006.01) |
| *H01M 4/62* | (2006.01) |

(52) U.S. Cl.
CPC .............. *H01M 4/485* (2013.01); *H01M 4/131* (2013.01); *H01M 4/366* (2013.01); *H01M 4/505* (2013.01); *H01M 4/525* (2013.01); *H01M 4/621* (2013.01); *H01M 4/625* (2013.01); *Y02E 60/122* (2013.01)

(58) Field of Classification Search
CPC ..... H01M 4/131; H01M 4/366; H01M 4/485; H01M 4/505; H01M 4/525; H01M 4/621; H01M 4/625; Y02E 60/122
USPC .......................... 429/209, 221, 231.3, 231.95
See application file for complete search history.

(56) References Cited

U.S. PATENT DOCUMENTS

| | | | |
|---|---|---|---|
| 6,503,657 B1* | 1/2003 | Takami et al. ................ | 429/188 |
| 2003/0094816 A1* | 5/2003 | Kazama ....................... | 290/40 C |
| 2009/0104510 A1* | 4/2009 | Fulop et al. .................. | 429/50 |
| 2010/0209771 A1* | 8/2010 | Shizuka et al. ............... | 429/207 |

FOREIGN PATENT DOCUMENTS

| | | |
|---|---|---|
| JP | 2001-110414 | 4/2001 |
| JP | 2002-110162 | 4/2002 |
| JP | 2003-036889 | 2/2003 |

(Continued)

*Primary Examiner* — Patrick Ryan
*Assistant Examiner* — Ben Lewis
(74) *Attorney, Agent, or Firm* — K&L Gates LLP

(57) ABSTRACT

(A) A cathode active material of a cathode includes a lithium phosphate compound represented by $Li_aM1_bPO_4$ (M is Fe and the like, $0 \le a \le 2$, $b \le 1$). (B) Fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive. (C) A ratio I2/I1 between intensity I1 of the peak P1 and intensity I2 of the peak P2 is from about 0.5 to about 20 both inclusive. (D) Porosity of the cathode is from about 30 percent to about 50 percent both inclusive.

13 Claims, 6 Drawing Sheets

(56) References Cited

FOREIGN PATENT DOCUMENTS

| JP | 2005-251554 | 9/2005 |
| JP | 2009-152188 | 7/2009 |
| JP | 2010-015904 | 1/2010 |
| JP | 2010-225366 | 10/2010 |
| JP | 4605287 | 1/2011 |
| WO | 2008/081944 | 7/2008 |

* cited by examiner

ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2012-129459 filed in the Japan Patent Office on Jun. 7, 2012, and JP 2013-076641 filed in the Japan Patent Office on Apr. 2, 2013, the entire content of which is hereby incorporated by reference.

BACKGROUND

The present application relates to an electrode in which an active material includes a lithium phosphate compound, to a secondary battery using the electrode, and to a battery pack, an electric vehicle, an electric power storage system, an electric power tool, and an electronic apparatus that use the secondary battery.

In recent years, various electronic apparatuses such as a mobile phone and a personal digital assistant (PDA) have been widely used, and it has been demanded to further reduce the size and the weight of the electronic apparatuses and to achieve their long life. Accordingly, as an electric power source for the electronic apparatuses, a battery, in particular, a small and light-weight secondary battery capable of providing high energy density has been developed. In these days, it has been considered to apply such a secondary battery to various other applications in addition to the foregoing electronic apparatuses. Representative examples of such other applications may include a battery pack attachably and detachably mounted on the electronic apparatuses or the like, an electric vehicle such as an electric automobile, an electric power storage system such as a home electric power server, and an electric power tool such as an electric drill.

Secondary batteries utilizing various charge and discharge principles to obtain a battery capacity have been proposed. In particular, a secondary battery utilizing insertion and extraction of an electrode reactant or a secondary battery utilizing precipitation and dissolution of an electrode reactant has attracted attention, since such a secondary battery provides higher energy density than lead batteries, nickel-cadmium batteries, and the like.

The secondary battery includes a cathode, an anode, and an electrolytic solution. The cathode contains an active material (cathode active material) related to a charge and discharge reaction. As the cathode active material, generally, a lithium composite oxide having a bedded salt-type crystal structure such as $LiCoO_2$, $LiNiO_2$, and $LiMn_2O_4$ is used to obtain a high capacity and a high voltage.

However, in the case where the lithium composite oxide is heated to a temperature from 200 deg C. to 300 deg C. both inclusive in a state of being charged, the lithium composite oxide easily extracts oxygen. Therefore, studies have been made to use a lithium phosphate compound instead of the lithium composite oxide taking safety into consideration. The lithium phosphate compound is $LiFePO_4$ or the like having an olivine-type crystal structure.

In the lithium phosphate compound, however, for example, a sufficient battery capacity and/or the like tends to be less likely to be obtained, since an insertion and extraction reaction of an electrode reactant at the time of charge and discharge is slower and the electric resistance is higher compared to in the lithium composite oxide. Therefore, in order to improve battery characteristics of a secondary battery using the lithium phosphate compound, various studies have been made.

Specifically, in order to increase a charge and discharge capacity at the time of large-current charge and large-current discharge, electrically-conductive fine particles such as Ag are supported by surfaces of powders of a lithium-iron-phosphate-based material represented by general formula $Li_zFe_{1-y}X_yPO_4$ (X represents Mg or the like, $0 \leq y \leq 0.3$, and $0<z \leq 1$), or a composite is configured of particles of a lithium-transition-metal composite oxide represented by general formula $LiMePO_4$ (Me represents a divalent transition metal) and carbon substance fine particles (for example, see Japanese Unexamined Patent Application Publication Nos. 2001-110414 and 2003-036889). In order to obtain superior electron conductivity, a compound represented by general formula $Li_xFePo_4$ ($0 \leq x \leq 1$) is mixed with a carbon material, and the primary particle diameter and the specific surface area of such a compound are defined (for example, see Japanese Unexamined Patent Application Publication No. 2002-110162). In order to improve discharge performance at the time of high-rate discharge, olivine-type lithium phosphate represented by general formula $LiMPO_4$ (M represents Co or the like) and a binder (polyacrylonitrile: PAN) is used (for example, see Japanese Unexamined Patent Application Publication No. 2005-251554). In order to improve cycle characteristics and safety at the time of high-rate discharge, the porosity, the fine pore diameter, and the like are defined for a cathode containing lithium-transition-metal-phosphate represented by general formula $Li_xMPO_4$ (M represents Co or the like, $0<x<1.3$) and/or the like (for example, see Japanese Unexamined Patent Application Publication Nos. 2010-225366 and 2010-015904). In order to balance a high battery capacity and superior load characteristics, a relation between the average particle diameter of primary particles of a lithium phosphate compound and the void (fine pore diameter) between the primary particles is defined (for example, see Japanese Patent No. 4605287).

SUMMARY

Although various studies have been made for the secondary battery using the lithium phosphate compound as a cathode active material, sufficient battery characteristics have not been obtained yet. Therefore, there is room for improvement.

It is desirable to provide an electrode, a secondary battery, a battery pack, an electric vehicle, an electric power storage system, an electric power tool, and an electronic apparatus that are capable of obtaining superior battery characteristics.

According to an embodiment of the present application, there is provided an electrode including an active material. (A) The active material includes a lithium phosphate compound represented by a following Formula (1). (B) Fine pore distribution measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive. (C) A ratio I2/I1 between intensity I1 of the peak P1 and intensity I2 of the peak P2 is from about 0.5 to about 20 both inclusive. (D) Porosity is from about 30 percent to about 50 percent both inclusive.

$$Li_aM1_bPO_4 \qquad (1)$$

(M1 is one or more of Fe, Mn, Mg, Ni, Co, Al, W, Nb, Ti, Si, Cr, Cu, and Zn; and a and b satisfy $0 \leq a \leq 2$ and $b \leq 1$.)

According to an embodiment of the present application, there is provided a secondary battery including: a cathode; an anode; and an electrolytic solution. (A) The cathode includes a cathode active material, and the cathode active material includes a lithium phosphate compound represented by a following Formula (1). (B) Fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive. (C) A ratio I2/I1 between intensity I1 of the peak P1 and intensity I2 of the peak P2 is from about 0.5 to about 20 both inclusive. (D) Porosity of the cathode is from about 30 percent to about 50 percent both inclusive.

$$Li_aM1_bPO_4 \quad (1)$$

(M1 is one or more of Fe, Mn, Mg, Ni, Co, Al, W, Nb, Ti, Si, Cr, Cu, and Zn; and a and b satisfy 0≤a≤2 and b≤1.)

According to an embodiment of the present application, there is provided a battery pack including: a secondary battery; a control section controlling a used state of the secondary battery; and a switch section switching the used state of the secondary battery according to an instruction of the control section. The secondary battery includes a cathode, an anode, and an electrolytic solution. (A) The cathode includes a cathode active material, and the cathode active material includes a lithium phosphate compound represented by a following Formula (1). (B) Fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive. (C) A ratio I2/I1 between intensity I1 of the peak P1 and intensity I2 of the peak P2 is from about 0.5 to about 20 both inclusive. (D) Porosity of the cathode is from about 30 percent to about 50 percent both inclusive.

$$Li_aM1_bPO_4 \quad (1)$$

(M1 is one or more of Fe, Mn, Mg, Ni, Co, Al, W, Nb, Ti, Si, Cr, Cu, and Zn; and a and b satisfy 0≤a≤2 and b≤1.)

According to an embodiment of the present application, there is provided an electric vehicle including: a secondary battery; a conversion section converting electric power supplied from the secondary battery into drive power; a drive section operating according to the drive power; and a control section controlling a used state of the secondary battery. The secondary battery includes a cathode, an anode, and an electrolytic solution. (A) The cathode includes a cathode active material, and the cathode active material includes a lithium phosphate compound represented by a following Formula (1). (B) Fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive. (C) A ratio I2/I1 between intensity I1 of the peak P1 and intensity I2 of the peak P2 is from about 0.5 to about 20 both inclusive. (D) Porosity of the cathode is from about 30 percent to about 50 percent both inclusive.

$$Li_aM1_bPO_4 \quad (1)$$

(M1 is one or more of Fe, Mn, Mg, Ni, Co, Al, W, Nb, Ti, Si, Cr, Cu, and Zn; and a and b satisfy 0≤a≤2 and b≤1.)

According to an embodiment of the present application, there is provided an electric power storage system including: a secondary battery; one or more electric devices supplied with electric power from the secondary battery; and a control section controlling the supplying of the electric power from the secondary battery to the one or more electric devices. The secondary battery includes a cathode, an anode, and an electrolytic solution. (A) The cathode includes a cathode active material, and the cathode active material includes a lithium phosphate compound represented by a following Formula (1). (B) Fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive. (C) A ratio I2/I1 between intensity I1 of the peak P1 and intensity I2 of the peak P2 is from about 0.5 to about 20 both inclusive. (D) Porosity of the cathode is from about 30 percent to about 50 percent both inclusive.

$$Li_aM1_bPO_4 \quad (1)$$

(M1 is one or more of Fe, Mn, Mg, Ni, Co, Al, W, Nb, Ti, Si, Cr, Cu, and Zn; and a and b satisfy 0≤a≤2 and b≤1.)

According to an embodiment of the present application, there is provided an electric power tool including: a secondary battery; and a movable section being supplied with electric power from the secondary battery. The secondary battery includes a cathode, an anode, and an electrolytic solution. (A) The cathode includes a cathode active material, and the cathode active material includes a lithium phosphate compound represented by a following Formula (1). (B) Fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive. (C) A ratio I2/I1 between intensity I1 of the peak P1 and intensity I2 of the peak P2 is from about 0.5 to about 20 both inclusive. (D) Porosity of the cathode is from about 30 percent to about 50 percent both inclusive.

$$Li_aM1_bPO_4 \quad (1)$$

(M1 is one or more of Fe, Mn, Mg, Ni, Co, Al, W, Nb, Ti, Si, Cr, Cu, and Zn; and a and b satisfy 0≤a≤2 and b≤1.)

According to an embodiment of the present application, there is provided an electronic apparatus including a secondary battery as an electric power supply source. The secondary battery includes a cathode, an anode, and an electrolytic solution. (A) The cathode includes a cathode active material, and the cathode active material includes a lithium phosphate compound represented by a following Formula (1). (B) Fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive. (C) A ratio I2/I1 between intensity I1 of the peak P1 and intensity I2 of the peak P2 is from about 0.5 to about 20 both inclusive. (D) Porosity of the cathode is from about 30 percent to about 50 percent both inclusive.

$$Li_aM1_bPO_4 \quad (1)$$

(M1 is one or more of Fe, Mn, Mg, Ni, Co, Al, W, Nb, Ti, Si, Cr, Cu, and Zn; and a and b satisfy 0≤a≤2 and b≤1.)

According to the electrode and the secondary battery according to the embodiment of the present application, since the electrode (or the cathode) satisfies the foregoing conditions (A) to (D), superior battery characteristics are obtainable. Further, according to the battery pack, the electric vehicle, the electric power storage system, the electric power tool, and the electronic apparatus according to the embodiments of the present application, similar effects are obtainable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
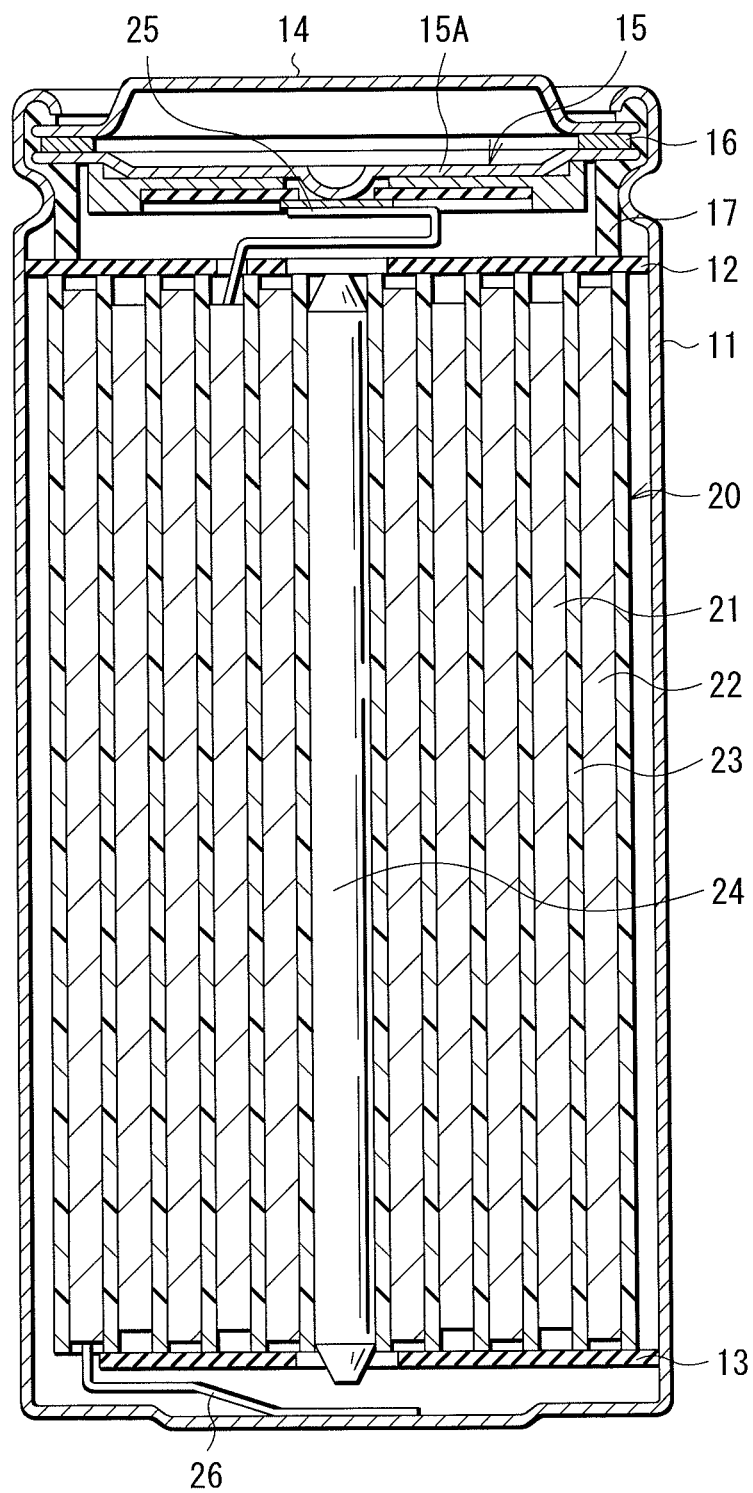
FIG. 1 is a cross-sectional view illustrating a configuration of a secondary battery (cylindrical type) including an electrode according to an embodiment of the present application.
Figure 2:
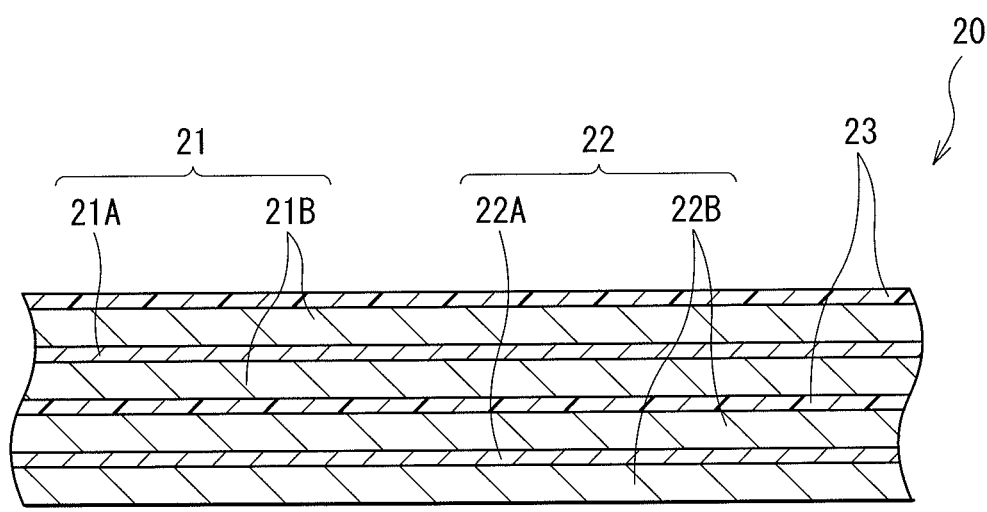
FIG. 2 is a cross-sectional view illustrating an enlarged part of a spirally wound electrode body illustrated in FIG. 1.

An embodiment of the present application will be described below in detail with reference to the drawings. The description will be given in the following order.
1. Electrode and Secondary Batteries
  1-1. Lithium Ion Secondary Battery (Cylindrical Type)
  1-2. Lithium Ion Secondary Battery (Laminated Film Type)
  1-3. Lithium Metal Secondary Battery (Cylindrical Type and Laminated Film Type)
2. Applications of Secondary Battery
  2-1. Battery Pack
  2-2. Electric Vehicle
  2-3. Electric Power Storage System
  2-4. Electric Power Tool
[1. Electrode and Secondary Batteries]
[1-1. Lithium Ion Secondary Battery (Cylindrical Type)]
FIG. 1 and FIG. 2 illustrate cross-sectional configurations of a secondary battery using an electrode according to an embodiment of the present application. FIG. 2 illustrates enlarged part of a spirally wound electrode body 20 illustrated in FIG. 1.

[Whole Configuration of Secondary Battery]

The secondary battery described here is a lithium secondary battery (lithium ion secondary battery) in which a capacity of an anode 22 is obtained by insertion and extraction of Li as an electrode reactant. In this case, for example, the foregoing electrode according to the embodiment of the present application may be used as a cathode 21.

The secondary battery may be, for example, a so-called cylindrical-type secondary battery. The secondary battery contains a spirally wound electrode body 20 and a pair of insulating plates 12 and 13 inside a battery can 11 in the shape of a substantially-hollow cylinder. In the spirally wound electrode body 20, for example, the cathode 21 and the anode 22 are layered with a separator 23 in between and are spirally wound.

The battery can 11 has a hollow structure in which one end of the battery can 11 is closed and the other end of the battery can 11 is opened. The battery can 11 may be made of, for example, iron, aluminum, an alloy thereof, or the like. It is to be noted that the surface of the battery can 11 may be plated with nickel or the like. The pair of insulating plates 12 and 13 is arranged to sandwich the spirally wound electrode body 20 in between, and to extend perpendicularly to the spirally wound periphery surface.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut electric connection between the battery cover 14 and the spirally wound electrode body 20. The PTC device 16 prevents abnormal heat generation resulting from a large current. As temperature rises, resistance of the PTC device 16 is increased accordingly. The gasket 17 may be made of, for example, an insulating material. The surface of the gasket 17 may be coated with asphalt.

In the center of the spirally wound electrode body 20, a center pin 24 is inserted. However, the center pin 24 is not necessarily inserted in the center of the spirally wound electrode body 20. For example, a cathode lead 25 made of a conductive material such as aluminum is connected to the cathode 21. For example, an anode lead 26 made of a conductive material such as nickel is connected to the anode 22. The cathode lead 25 is attached to the safety valve mechanism 15 by welding or the like, and is electrically connected to the battery cover 14. The anode lead 26 is attached to the battery can 11 by welding or the like, and is electrically connected to the battery can 11.

[Cathode]

The cathode 21 has a cathode active material layer 21B on a single surface or both surfaces of a cathode current collector 21A. The cathode current collector 21A may be made of, for example, a conductive material such as aluminum, nickel, and stainless steel.

The cathode active material layer 21B contains, as cathode active materials, one or more of cathode materials capable of inserting and extracting lithium ions. The cathode active material layer 21B may further contain other materials such as a cathode binder and a cathode electric conductor as necessary.

The cathode material is a lithium phosphate compound represented by the following Formula (1) (in the following description, simply referred to as "lithium phosphate compound"). One reason for this is that, since the lithium phosphate compound is less likely to release oxygen even if the lithium phosphate compound is heated to temperature equal to or higher than 350 deg C., superior safety is obtainable at the time of charge and discharge thereby. Another reason for this is that charge is performed in an approximately-constant current state if charge is made under constant current and constant voltage conditions, and therefore, in the case of using the lithium phosphate compound, charging time is reduced compared to in the case of using a lithium composite oxide if charge is made under the same charge conditions.

$$Li_aM1_bPO_4 \quad (1)$$

In Formula 1, M1 is one or more of Fe, Mn, Mg, Ni, Co, Al, W, Nb, Ti, Si, Cr, Cu, and Zn; and a and b satisfy $0 \leq a \leq 2$ and $b \leq 1$.

The lithium phosphate compound is a phosphate compound containing Li and one or more transition metal elements as constituent elements, and has an olivine-type crystal structure. The lithium phosphate compound may contain, for example, secondary particles that are each an aggregate of a plurality of primary particles. M1 in Formula (1) is not particularly limited as long as M1 is one or more of the foregoing metal elements such as Fe. Preferably, b may satisfy $0<b \leq 1$ but b may satisfy $0 \leq b \leq 1$.

In particular, the lithium phosphate compound is preferably a compound represented by the following Formula (2). One reason for this is that, since the lithium phosphate compound contains Fe as a constituent element, life of the secondary battery is increased. More specifically, an operation voltage of the lithium phosphate compound containing Fe as a constituent element is around about 3.4 V. Therefore, in the case where the lithium phosphate compound is used as a cathode active material, a secondary battery is allowed to be operated at an electric potential that is less likely to induce, for example, oxidation decomposition of an electrolytic solution and/or the like. Thereby, for example, cycle characteristics, conservation characteristics, and the like of the secondary battery are improved, and therefore, the secondary battery is allowed to be used for a long time. M2 in Formula (2) is not particularly limited as long as M2 is one or more of the following series of metal elements such as Mn.

$$Li_cFe_dM2_ePO_4 \quad (2)$$

In Formula 2, M2 is one or more of Mn, Mg, Ni, Co, Al, W, Nb, Ti, Si, Cr, Cu, and Zn; and c, d, and e satisfy $0 \leq c \leq 2$, $0<d \leq 1$, $0 \leq e<1$, and $d+e \leq 1$.

Specific examples of the cathode material may include $LiFePO_4$, $LiMnPO_4$, $LiMgPO_4$, $LiNiPO_4$, $LiCoPO_4$, $LiAlPO_4$, $LiWPO_4$, $LiNbPO_4$, $LiTiPO_4$, $LiSiPO_4$, $LiCrPO_4$, $LiCuPO_4$, $LiZnPO_4$, $LiFe_{0.25}Mn_{0.75}PO_4$, $LiFe_{0.50}Mn_{0.50}PO_4$, $LiFe_{0.90}Mn_{0.10}PO_4$, $LiFe_{0.90}Mg_{0.10}PO_4$, $LiFe_{0.90}Ni_{0.10}PO_4$, $LiFe_{0.90}Co_{0.10}PO_4$, $LiFe_{0.90}Al_{0.10}PO_4$, $LiFe_{0.90}W_{0.10}PO_4$, $LiFe_{0.90}Nb_{0.10}PO_4$, $LiFe_{0.90}Ti_{0.10}PO_4$, $LiFe_{0.90}Si_{0.10}PO_4$, $LiFe_{0.90}Cr_{0.10}PO_4$, $LiFe_{0.90}Cu_{0.10}PO_4$, and $LiFe_{0.90}Zn_{0.10}PO_4$. However, a compound other than the foregoing compounds may be used as long as the conditions of the chemical formula shown in Formula (1) are satisfied.

In particular, the cathode 21, that is, the cathode active material layer 21B containing the lithium phosphate compound that is a cathode material has a plurality of gaps (fine pores or voids) therein. The gaps may be, for example, spaces generated between particles such as a cathode active material, a cathode binder, and a cathode electric conductor. In association therewith, the cathode active material layer 21B satisfies the following three conditions with regard to the fine pores or the voids.

As a first condition, fine pore distribution of the cathode 21 (cathode active material layer 21B) measured by a mercury intrusion method indicates a peak P1 in the pore diameter range of equal to or more than 0.01 μm and less than 0.15 μm, and indicates a peak P2 in the pore diameter range from 0.15 μm to 0.9 μm both inclusive.

The foregoing "fine pore distribution measured by a mercury intrusion method" is a measurement result of fine pore distribution measured using a mercury porosimeter. The fine pore distribution indicates transition (distribution) of change ratio of mercury intrusion amount with respect to the plurality of fine pores in the cathode active material layer 21B. The horizontal axis indicates a pore diameter (μm) of the fine pores, and the vertical axis indicates the change ratio of the mercury intrusion amount (logarithm of differential fine pore volume). In measurement of the fine pore distribution using the mercury porosimeter, intrusion amount V of mercury with respect to a plurality of fine pores is measured as pressure P is increased in stages. Therefore, the change ratio (ΔV/ΔP) of the intrusion amount of the mercury is plotted with respect to the pore diameter of the fine pores. However, the surface tension of the mercury is 485 mN/m, the contact angle is 130 deg, and the relation between the pore diameter of the fine pores and the pressure is approximated to 180/pressure=pore diameter. The mercury porosimeter used here may be, for example, AutoPore IV9500 available from Shimadzu Corporation or the like.

It is to be noted that, upon measuring the fine pore distribution, the cathode 21 after being compression-molded by using, for example, a roll pressing machine or the like as described later (in a state of not being charged or discharged) may be used. Alternatively, after the secondary battery is fabricated, the secondary battery is charged and discharged one or more times, the secondary battery is subsequently disassembled, and the cathode 21 that is taken out therefrom may be used. However, in the case where the cathode 21 after being charged and discharged is used, the cathode 21 in a state of being discharged is preferably used. The cathode 21 in a state of being discharged refers to the cathode 21 taken out from a secondary battery that has been discharged at a constant current of 0.1 C until a battery voltage reaches 2 V and has been subsequently disassembled. "0.1 C" is a current value at which a battery capacity (theoretical capacity) is completely discharged in 10 hours.

In the case where the cathode 21 contains the lithium phosphate compound, if the fine pore distribution of the cathode active material layer 21B is measured using the mercury porosimeter, the two peaks P1 and P2 are mainly detected. On the other hand, in the case where the cathode 21 contains the lithium composite oxide, one peak tends to be detected mainly. The peak P1 detected in the range of relatively-small pore diameter may be mainly due to, for example, gaps between primary particles of the lithium phosphate compound or the like. On the other hand, the peak P2 detected in the range of relatively-large pore diameter may be mainly due to, for example, gaps between secondary particles of the lithium phosphate compound or the like.

The wording "the fine pore distribution indicates the peak P1 in the fine pore diameter range of equal to or more than 0.01 μm and less than 0.15 μm" refers to a state that the apex of the peak P1 is located in the foregoing range in the fine pore distribution. Similarly, the wording "the fine pore distribution indicates the peak P2 in the pore diameter range from 0.15 μm to 0.9 μm both inclusive" refers to a state that the apex of the peak P2 is located in the foregoing range in the fine pore distribution. Positions (pore diameters) of the peaks P1 and P2 are determined based on the pore diameters corresponding to the positions of the respective apexes from the fine pore distribution of the cathode 21 measured by the mercury porosimeter.

One reason why the positions of the peaks P1 and P2 are in the foregoing pore diameter ranges is that, in this case, an electrolytic solution easily penetrates into the cathode active material layer 21B, and electron conductivity and ion conductivity between primary particles and between secondary particles are secured in the cathode active material layer 21B. More specifically, in the case where the position of the peak P1 is smaller than 0.01 μm, permeability of the electrolytic solution is lowered. In the case where the position of the peak P1 is equal to or larger than 0.15 μm, the permeability of the electrolytic solution is improved, while the electron conductivity and the ion conductivity between the primary particles are lowered. Further, in the case where the position of the peak P2 is smaller than 0.15 μm, the permeability of the electrolytic solution is lowered. In the case where the position of the peak P2 is larger than 0.9 μm, the permeability of the electrolytic solution is improved, while the electron conductivity and the ion conductivity between the secondary particles are lowered. That is, in the case where the positions of the peaks P1 and P2 are in the foregoing pore diameter ranges, balance between the permeability of the electrolytic solution, and the electron conductivity and the ion conductivity between the primary particles and between the secondary particles becomes appropriate.

As a second condition, a ratio (intensity ratio) I2/I1 between intensity I1 of the peak P1 and intensity I2 of the peak P2 is from 0.5 to 20 both inclusive.

The intensity ratio I2/I1 is determined by the fine pore distribution measured by the mercury porosimeter. Specifically, the intensity I1 and the intensity I2 are determined based on heights of the peaks P1 and P2 in the fine pore distribution, that is, distances from the referential point (intensity: 0) to the apexes of the peaks P1 and P2, and subsequently, a value obtained by dividing the intensity I2 by the intensity I1 is calculated.

One reason why the intensity ratio I2/I1 is in the foregoing range is that, in this case, as in the case of the positions of the peaks P1 and P2 described above, an electrolytic solution easily penetrates into the cathode active material layer 21B, and electron conductivity and ion conductivity are secured in the cathode active material layer 21B. More specifically, in the case where the intensity ratio I2/I1 is smaller than 0.5, permeability of the electrolytic solution is lowered. In the case where the intensity ratio I2/I1 is larger than 20, permeability of the electrolytic solution is improved, while the electron conductivity and the ion conductivity are lowered.

As a third condition, the porosity of the cathode 21 is from 30% to 50% both inclusive.

The term "porosity" refers to the ratio of the total volume of voids with respect to the volume of the cathode active material layer 21B in the case where the cathode active material layer 21B has a plurality of voids therein. In this case, the porosity may be calculated, for example, from the density ($g/cm^3$) of the cathode active material layer 21B and the true density ($g/cm^3$) of a constituent material of the cathode active material layer 21B. Calculation formula thereof is porosity (%)[1−(the density of the cathode active material layer 21B/ the true density of the constituent material)]×100. The foregoing wording "density of the cathode active material layer 21B" refers to the density of a whole including the voids. That is, the density of the cathode active material layer 21B refers to the average density of the solid content of the cathode active material layer 21B out of the cathode 21 including the cathode current collector 21A and the cathode active material layer 21B, and may be calculated by, for example, measuring weight and thickness of the cathode 21 and the cathode current collector 21A. On the other hand, the wording "the true density of the constituent material" refers to the density of the solid content (constituent material) configuring the cathode active material layer 21B, that is, theoretical density in which the voids are not taken into consideration.

The porosity may be calculated by measuring the volume ($cm^3$) of the voids existing in the cathode active material layer 21B, and subsequently calculating the ratio of the volume ($cm^3$) of the voids with respect to the volume of the cathode active material layer 21B (including the voids). Calculation expression thereof is porosity (%)=(the volume of the voids/ the volume of the cathode active material layer 21B)×100. The volume of the voids may be measured together with the fine pore distribution by using, for example, a mercury porosimeter.

In the case where the lithium phosphate compound contains the primary particles and the secondary particles as described above, the average particle diameters (median diameters) of the primary particles and the secondary particles are not particularly limited. One reason for this is that, if the foregoing three conditions with regard to the fine pores or the voids in the cathode active material layer 21B are satisfied, the foregoing advantage is obtainable without depending on the average particle diameters thereof. In particular, the average particle diameter (D50) of the primary particles may be preferably from 0.05 μm to 2 μm both inclusive, and the average particle diameter (D50) of the secondary particles may be preferably from 1 μm to 30 μm both inclusive. One reason for this is that, in this case, while a high battery capacity is secured, the electron conductivity between the primary particles and between the secondary particles is further improved.

More specifically, in the case where the average particle diameter of the primary particles is smaller than 0.05 μm, the particles become amorphous, and therefore, a sufficient battery capacity is not obtainable. On the other hand, in the case where the average particle diameter of the primary particles is larger than 2 μm, electron conductivity between the particles is lowered. Further, in the case where the average particle diameter of the secondary particles is smaller than 1 μm, a great amount of cathode binder may be necessary for binding the cathode active material, and therefore, a sufficient battery capacity is not obtainable. On the other hand, in the case where the average particle diameter of the secondary particles is larger than 30 μm, not only the electron conductivity between the particles, but also the electron conductivity in the particles is lowered.

The average particle diameter of the primary particles is obtained by measuring each longer diameter (μm) of a plurality of primary particles with the use of an observation image obtained by, for example, scanning electron microscope (SEM) or the like, and subsequently calculating the average value thereof (the number of measurement: 50). The average particle diameter of the secondary particles is calculated from the average value of a volume-based particle size distribution obtained by, for example, a laser diffraction particle size distribution apparatus or the like. Alternatively, the average particle diameter of the secondary particles may be obtained by an observation image by SEM as in the case of the primary particles.

In the lithium phosphate compound, an electrically-conductive layer may be preferably provided on part or all of the surfaces of the primary particles, since thereby, electric resistance of the cathode active material is lowered. A formation material of the electrically-conductive layer may preferably include a carbon material. Specifically, examples of formation materials of the electrically-conductive layer may include carbon (carbon material) such as acetylene black and Ketjen black, and an organic material carbonized by firing. More specifically, examples of the organic material carbonized by firing may include sugars and polymer materials. Examples of the sugars may include maltose, glucose, and lactose. Examples of the polymer materials may include polyvinyl alcohol, polyacrylic acid, and polyvinyl pyrrolidone. It goes without saying that the carbonized organic material may be a material other than the foregoing materials.

In the case where the electrically-conductive layer is formed on the surfaces of the primary particles, the electrically-conductive layer may be formed together with the lithium phosphate compound in the course of synthesizing the lithium phosphate compound, for example. Alternatively, for example, the electrically-conductive layer may be formed separately from the lithium phosphate compound after the lithium phosphate compound is synthesized. In the case where the electrically-conductive layer is formed at the time of synthesizing the lithium phosphate compound, for example, when the lithium phosphate compound is formed by using, for example, a solid-phase method, a liquid-phase method, or the like, a carbon source material or a carbon material is added to a raw material, and firing is performed under inactive atmosphere. On the other hand, in the case where the electrically-conductive layer is formed after the lithium phosphate compound is synthesized, for example, a carbon source material or a carbon material is added to the synthesized lithium phosphate compound by using, for example, a solid-phase method, a liquid-phase method, or the like and firing is performed under inactive atmosphere. It is to be noted that examples of the carbon source material may include glucose, and examples of the carbon material may include acetylene black. Examples of the solid-phase method and the liquid-phase method may include a mechanochemical method, a sol-gel method, and an organic matter thermal decomposition method.

In the case where the cathode active material layer 21B contains a cathode binder together with the cathode active material (lithium phosphate compound), the contents of the cathode active material and the cathode binder in the cathode active material layer 21B are not particularly limited. In particular, the content of the cathode active material may be preferably equal to or larger than 80 wt % with respect to the total content of the cathode active material and the cathode binder, and the content of the cathode binder may be preferably equal to or less than 20 wt % with respect to the foregoing total content. One reason for this is that, in this case, while, for example, a battery capacity and/or the like is secured, the foregoing advantage is obtained.

Further, in the case where the cathode active material layer 21B contains the cathode binder and a cathode electric conductor together with the cathode active material, the contents of the cathode active material, the cathode binder, and the cathode electric conductor in the cathode active material layer 21B are not particularly limited. In particular, the content of the cathode active material may be preferably equal to or larger than 80 wt % with respect to the total content of the cathode active material, the cathode binder, and the cathode electric conductor. Further, the content of the cathode binder may be preferably equal to or less than 10 wt % with respect to the foregoing total content, and the content of the cathode electric conductor may be preferably equal to or less than 10 wt % with respect to the foregoing total content.

Examples of the cathode binder may include one or more of synthetic rubbers, polymer materials, and the like. Examples of the synthetic rubber may include a styrene-butadiene-based rubber, a fluorine-based rubber, and ethylene propylene diene. Examples of the polymer material may include polyvinylidene fluoride and polyimide.

Examples of the cathode electric conductor may include one or more of carbon materials and the like. Examples of the carbon materials may include graphite, carbon black, acetylene black, and Ketjen black. The cathode electric conductor may be a metal material, a electrically-conductive polymer, or the like as long as the material has electric conductivity.

It is to be noted that the cathode active material layer 21B may further contain other cathode material. The foregoing "other cathode material" may be, for example, a lithium-containing compound (excluding the lithium phosphate compound), and more specifically, may be a lithium composite oxide (lithium-transition-metal composite oxide) containing Li and one or more transition metal elements as constituent elements. Examples of the lithium-transition-metal composite oxide may include $LiCoO_2$, $LiNiO_2$, and $LiMn_2O_4$.

In addition thereto, the cathode material may be, for example, an oxide, a disulfide, a chalcogenide, an electrically-conductive polymer, or the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene.

[Anode]

The anode 22 has an anode active material layer 22B on a single surface or both surfaces of an anode current collector 22A.

The anode current collector 22A may be made of, for example, an electrically-conductive material such as copper, nickel, and stainless steel. The surface of the anode current collector 22A may be preferably roughened. Thereby, due to a so-called anchor effect, adhesion characteristics of the anode active material layer 22B with respect to the anode current collector 22A are improved. In this case, it is enough that the surface of the anode current collector 22A in a region opposed to the anode active material layer 22B is roughened at minimum. Examples of roughening methods may include a method of forming fine particles by electrolytic treatment. The electrolytic treatment is a method of forming the fine particles (providing concavity and convexity) on the surface of the anode current collector 22A, using an electrolytic method, in an electrolytic bath. A copper foil fabricated by an electrolytic method is generally called "electrolytic copper foil."

The anode active material layer 22B contains one or more of anode materials capable of inserting and extracting lithium ions as anode active materials, and may also contain other materials such as an anode binder and an anode electric conductor as necessary. Details of the anode binder and the anode electric conductor may be, for example, similar to those of the cathode binder and the cathode electric conductor, respectively. However, the chargeable capacity of the anode material may be preferably larger than the discharge capacity of the cathode 21 in order to prevent lithium metal from being unintentionally precipitated on the anode 22 in the middle of charge. That is, the electrochemical equivalent of the anode material capable of inserting and extracting lithium ions may be preferably larger than the electrochemical equivalent of the cathode 21.

The anode material may be, for example, a carbon material, since, in the carbon material, its crystal structure change at the time of insertion and extraction of lithium ions is extremely small, and therefore, the carbon material provides high energy density and superior cycle characteristics. Further, the carbon material functions as an anode electric conductor as well. Examples of the carbon material may include graphitizable carbon, non-graphitizable carbon in which the spacing of (002) plane is equal to or greater than 0.37 nm, and graphite in which the spacing of (002) plane is equal to or smaller than 0.34 nm. More specifically, examples of the carbon material may include pyrolytic carbons, cokes, glassy carbon fiber, an organic polymer compound fired body, activated carbon, and carbon blacks. Of the foregoing, examples of the cokes may include pitch coke, needle coke, and petroleum coke. The organic polymer compound fired body is obtained by firing (carbonizing) a polymer compound such as a phenol resin and a furan resin at appropriate temperature. In addition thereto, the carbon material may be low crystalline carbon or amorphous carbon heat-treated at temperature of about 1000 deg C. or less. It is to be noted that the shape of the carbon material may be any of a fibrous shape, a spherical shape, a granular shape, and a scale-like shape.

Further, the anode material may be, for example, a material (metal-based material) containing one, or two or more of metal elements and metalloid elements as constituent elements, since higher energy density is thereby obtained. Such a metal-based material may be a simple substance, an alloy, or a compound, may be two or more thereof, or may have one or more phases thereof in part or all thereof. "Alloy" includes a material containing one or more metal elements and one or more metalloid elements, in addition to a material configured of two or more metal elements. Further, the "alloy" may contain a nonmetallic element. Examples of the structure thereof may include a solid solution, a eutectic crystal (eutectic mixture), an intermetallic compound, and a structure in which two or more thereof coexist.

Examples of the foregoing metal elements and the foregoing metalloid elements may include one or more of metal elements and metalloid elements capable of forming an alloy with Li. Specific examples thereof may include Mg, B, Al, Ga, In, Si, Ge, Sn, Pb, Bi, Cd, Ag, Zn, Hf, Zr, Y, Pd, and Pt. In particular, Si, Sn, or both are preferable. One reason for this is that Si and Sn have a superior ability of inserting and extracting lithium ions, and therefore, provide high energy density.

A material containing Si, Sn, or both as constituent elements may be a simple substance, an alloy, or a compound of Si or Sn, may be two or more thereof, or may have one or more phases thereof in part or all thereof. The simple substance merely refers to a general simple substance (a small amount of impurity may be therein contained), and does not necessarily refer to a purity 100% simple substance.

The alloys of Si may contain one or more of elements such as Sn, Ni, Cu, Fe, Co, Mn, Zn, In, Ag, Ti, Ge, Bi, Sb, and Cr as constituent elements other than Si. The compounds of Si may contain one or more of C, O, and the like as constituent elements other than Si. It is to be noted that, for example, the compounds of Si may contain one or more of the elements described for the alloys of Si as constituent elements other than Si.

Examples of the alloys of Si and the compounds of Si may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$), and $LiSiO$. v in $SiO_v$ may be in the range of $0.2<v<1.4$.

The alloys of Sn may contain, for example, one or more of elements such as Si, Ni, Cu, Fe, Co, Mn, Zn, In, Ag, Ti, Ge, Bi, Sb, and Cr as constituent elements other than Sn. The compounds of Sn may contain, for example, one or more of elements such as C and O as constituent elements other than Sn. It is to be noted that the compounds of Sn may contain, for example, one or more of elements described for the alloys of Sn as constituent elements other than Sn. Examples of the alloys of Sn and the compounds of Sn may include $SnO_w$ ($0<w\leq 2$), $SnSiO_3$, $LiSnO$, and $Mg_2Sn$.

Further, as a material containing Sn, for example, a material containing a second constituent element and a third constituent element in addition to Sn as a first constituent element is preferable. Examples of the second constituent element may include one or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element may include one or more of B, C, Al, P, and the like. In the case where the second constituent element and the third constituent element are contained, a high battery capacity, superior cycle characteristics, and the like are obtained.

In particular, a material (SnCoC-containing material) containing Sn, Co, and C as constituent elements is preferable. The composition of the SnCoC-containing material may be, for example, as follows. That is, the C content is from 9.9 mass % to 29.7 mass % both inclusive, and the ratio of Sn and Co contents (Co/(Sn+Co)) is from 20 mass % to 70 mass % both inclusive, since high energy density is obtained in such a composition range.

It is preferable that the SnCoC-containing material have a phase containing Sn, Co, and C. Such a phase may be preferably low-crystalline or amorphous. The phase is a reaction phase capable of reacting with Li. Due to existence of the reaction phase, superior characteristics are obtained. The half bandwidth of the diffraction peak obtained by X-ray diffraction of the phase is preferably equal to or greater than 1 deg based on diffraction angle of 2θ in the case where CuKα ray is used as a specific X ray, and the insertion rate is 1 deg/min. Thereby, lithium ions are more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with Li is allowed to be easily determined by comparison between X-ray diffraction charts before and after electrochemical reaction with Li. For example, if the position of the diffraction peak after electrochemical reaction with Li is changed from the position of the diffraction peak before the electrochemical reaction with Li, the obtained diffraction peak corresponds to the reaction phase capable of reacting with Li. In this case, for example, the diffraction peak of the low crystalline reaction phase or the amorphous reaction phase is seen in the range of 2θ=from 20 deg to 50 deg both inclusive. Such a reaction phase may have, for example, the foregoing respective constituent elements, and the low crystalline or amorphous structure thereof possibly results from existence of C mainly.

In the SnCoC-containing material, part or all of C as a constituent element may have preferably bonded to a metal element or a metalloid element as other constituent element, since cohesion or crystallization of Sn and/or the like is suppressed thereby. The bonding state of elements is allowed to be checked by, for example, X-ray photoelectron spectroscopy (XPS). In a commercially available device, for example, as a soft X ray, Al—Kα ray, Mg—Kα ray, or the like may be used. In the case where part or all of C are bonded to a metal element, a metalloid element, or the like, the peak of a synthetic wave of is orbit of C (C1s) is shown in a region lower than 284.5 eV. It is to be noted that, in the device, energy calibration is made so that the peak of 4f orbit of Au atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis is made by using commercially-available software to isolate both peaks from each other. In the waveform analysis, the position of the main peak existing on the lowest bound energy side is the energy standard (284.8 eV).

It is to be noted that the SnCoC-containing material is not limited to the material (SnCoC) configured of only Sn, Co, and C (SnCoC) as constituent elements. That is, the SnCoC-containing material may further contain, for example, one or more of Si, Fe, Ni, Cr, In, Nb, Ge, Ti, Mo, Al, P, Ga, Bi, and the like as constituent elements as necessary.

In addition to the SnCoC-containing material, a material containing Sn, Co, Fe, and C as constituent elements (SnCoFeC-containing material) is also preferable. The composition of the SnCoFeC-containing material may be any composition. For example, the composition in which the Fe content is set small is as follows. That is, the C content is from 9.9 mass % to 29.7 mass % both inclusive, the Fe content is from 0.3 mass % to 5.9 mass % both inclusive, and the ratio of contents of Sn and Co (Co/(Sn+Co)) is from 30 mass % to 70 mass % both inclusive. Further, the composition in which the Fe content is set large is as follows. That is, the C content is from 11.9 mass % to 29.7 mass % both inclusive, the ratio of contents of Sn, Co, and Fe ((Co+Fe)/(Sn+Co+Fe)) is from 26.4 mass % to 48.5 mass % both inclusive, and the ratio of contents of Co and Fe (Co/(Co+Fe)) is from 9.9 mass % to 79.5 mass % both inclusive. In such a composition range, high energy density is obtained. The physical properties (such as half bandwidth) of the SnCoFeC-containing material are similar to those of the foregoing SnCoC-containing material.

In addition thereto, the anode material may be, for example, a metal oxide, a polymer compound, or the like. Examples of the metal oxide may include iron oxide, ruthenium oxide, and molybdenum oxide. Examples of the polymer compound may include polyacetylene, polyaniline, and polypyrrole.

The anode active material layer 22B may be formed by, for example, a coating method, a vapor-phase deposition method, a liquid-phase deposition method, a spraying method, a firing method (sintering method), or a combination of two or more of these methods. The coating method may be a method in which, for example, after a particulate (powder) anode active material is mixed with an anode binder and/or the like, the mixture is dispersed in a solvent such as an organic solvent, and the anode current collector 22A is coated with the resultant. Examples of the vapor-phase deposition method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method may include an electrolytic plating method and an electroless plating method. The spraying method is a method in which an anode active material in a fused state or a semi-fused state is sprayed to the anode current collector 22A. The firing method may be, for example, a method in which after the anode current collector 22A is coated by a coating method, heat treatment is performed at temperature higher than the melting point of the anode binder and/or the like. Examples of the firing method may include a publicly-known technique such as an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium ions is larger than the electrochemical equivalent of the cathode. Further, in the case where the open circuit voltage (that is, a battery voltage) at the time of completely-charged state is equal to or greater than 4.25 V, the extraction amount of lithium ions per unit mass is larger than that in the case where the open circuit voltage is 4.20 V even if the same cathode active material is used. Therefore, amounts of the cathode active material and the anode active material are adjusted accordingly. Thereby, high energy density is obtainable.

[Separator]

The separator 23 separates the cathode 21 from the anode 22, and passes lithium ions while preventing current short circuit resulting from contact of both electrodes. The separator 23 may be, for example, a porous film made of a synthetic resin, ceramics, or the like. The separator 23 may be a laminated film in which two or more types of porous films are laminated. Examples of the synthetic resin may include polytetrafluoroethylene, polypropylene, and polyethylene.

In particular, the separator 23 may include, for example, the foregoing porous film (base material layer) and a polymer compound layer provided on one surface or both surfaces of the base material layer. One reason for this is that, thereby, adhesion characteristics of the separator 23 with respect to the cathode 21 and the anode 22 are improved, and therefore, skewness of the spirally wound electrode body 20 is suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance is less likely to be increased, and battery swollenness is suppressed.

The polymer compound layer may contain, for example, a polymer material such as polyvinylidene fluoride, since such a polymer material has superior physical strength and is electrochemically stable. However, the polymer material may be a material other than polyvinylidene fluoride. The polymer compound layer may be formed as follows, for example. That is, after a solution in which the polymer material is dissolved is prepared, the base material layer is coated with the solution, and the resultant is subsequently dried. Alternatively, the base material layer may be soaked in the solution and may be subsequently dried.

[Electrolytic Solution]

The separator 23 is impregnated with an electrolytic solution as a liquid electrolyte. The electrolytic solution contains a solvent and an electrolyte salt, and may contain other material such as an additive as necessary.

[Solvent]

The solvent contains one or more of nonaqueous solvents such as an organic solvent.

Examples of the nonaqueous solvents may include a cyclic ester carbonate, a chain ester carbonate, lactone, a chain carboxylic ester, and nitrile, since a superior battery capacity, superior cycle characteristics, superior conservation characteristics, and the like are thereby obtained. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methylpropyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

In addition thereto, the nonaqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, or dimethyl sulfoxide, since thereby, a similar advantage is obtained.

In particular, one or more of ethylene carbonate, propylene carbonate, dimethyl carbonate, diethyl carbonate, and ethyl methyl carbonate are preferable, since a further superior battery capacity, further superior cycle characteristics, further superior conservation characteristics, and the like are thereby obtained. In this case, a combination of a high viscosity (high dielectric constant) solvent (for example, specific dielectric constant $\in \geq 30$) such as ethylene carbonate and propylene carbonate and a low viscosity solvent (for example, viscosity$\geq 1$ mPa·s) such as dimethyl carbonate, ethylmethyl carbonate, and diethyl carbonate is more preferable. One reason for this is that the dissociation property of the electrolyte salt and ion mobility are thereby improved.

In particular, the solvent may preferably contain one or more of unsaturated cyclic ester carbonates. One reason for this is that a stable protective film is formed mainly on the surface of the anode 22 at the time of charge and discharge, and therefore, a decomposition reaction of the electrolytic solution is suppressed. The unsaturated cyclic ester carbonate is a cyclic ester carbonate including one or more unsaturated carbon bonds (carbon-carbon double bonds). Specific examples of the unsaturated cyclic ester carbonate may include vinylene carbonate, vinylethylene carbonate, and methyleneethylene carbonate. The content of the unsaturated cyclic ester carbonate in the solvent is not particularly limited, and may be, for example, from 0.01 wt % to 10 wt % both inclusive. However, specific examples of the unsaturated cyclic ester carbonate may include a compound other than the foregoing compounds.

Further, the solvent may preferably contain one or more of halogenated ester carbonates. One reason for this is that a stable protective film is formed mainly on the surface of the anode 22 at the time of charge and discharge, and therefore, a decomposition reaction of the electrolytic solution is suppressed. The halogenated ester carbonate is a cyclic ester carbonate having one or more halogens as constituent elements or a chain ester carbonate having one or more halogens as constituent elements. Examples of the cyclic halogenated ester carbonate may include 4-fluoro-1,3-dioxolane-2-one and 4,5-difluoro-1,3-dioxolane-2-one. Examples of the chain halogenated ester carbonate may include fluoromethyl methyl carbonate, bis(fluoromethyl)carbonate, and difluoromethyl methyl carbonate. Although the content of the halogenated ester carbonate in the solvent is not particularly limited, the content thereof may be, for example, from 0.01 wt % to 50 wt % both inclusive. However, specific examples of the halogenated ester carbonate may include a compound other than the foregoing compounds.

Further, the solvent may preferably contain sultone (cyclic sulfonic ester), since the chemical stability of the electrolytic solution is further improved thereby. Examples of sultone may include propane sultone and propene sultone. Although the sultone content in the solvent is not particularly limited, for example, the sultone content may be from 0.5 wt % to 5 wt % both inclusive. However, specific examples of the sultone may include a compound other than the foregoing compounds.

Further, the solvent may preferably contain an acid anhydride since the chemical stability of the electrolytic solution is thereby further improved. Examples of the acid anhydrides may include a carboxylic anhydride, a disulfonic anhydride, and a carboxylic acid sulfonic acid anhydride. Examples of the carboxylic anhydride may include a succinic anhydride, a glutaric anhydride, and a maleic anhydride. Examples of the disulfonic anhydride may include an ethane disulfonic anhydride and a propane disulfonic anhydride. Examples of the carboxylic acid sulfonic acid anhydride may include a sulfobenzoic anhydride, a sulfopropionic anhydride, and a sulfobutyric anhydride. Although the content of the acid anhydride in the solvent is not particularly limited, for example, the content thereof may be from 0.5 wt % to 5 wt % both inclusive. However, specific examples of the acid anhydrides may include a compound other than the foregoing compounds.

[Electrolyte Salt]

The electrolyte salt may contain, for example, one or more of lithium salts described below. However, the electrolyte salt may be a salt other than the lithium salt (such as a light metal salt other than the lithium salt).

Examples of the lithium salts may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr). Thereby, a superior battery capacity, superior cycle characteristics, superior conservation characteristics, and the like are obtained. However, specific examples of the lithium salt are not limited to the foregoing compounds, and other compounds may be used.

In particular, one or more of $LiPF_6$, $LiBF_4$, $LiClO_4$, and $LiAsF_6$ are preferable, and $LiPF_6$ is more preferable, since the internal resistance is thereby lowered, and therefore, a higher effect is obtained.

The content of the electrolyte salt is preferably from 0.3 mol/kg to 3.0 mol/kg both inclusive with respect to the solvent, since high ion conductivity is obtained thereby.

[Operation of Secondary Battery]

In the secondary battery, for example, at the time of charge, lithium ions extracted from the cathode 21 may be inserted in the anode 22 through the electrolytic solution. Further, at the time of discharge, lithium ions extracted from the anode 22 may be inserted in the cathode 21 through the electrolytic solution.

[Method of Manufacturing Secondary Battery]

The secondary battery may be manufactured, for example, by the following procedure.

First, the cathode 21 is fabricated. The cathode active material containing the foregoing lithium phosphate compound is mixed with a cathode binder, a cathode electric conductor, and/or the like as necessary to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. Subsequently, the cathode active material layer 21B is compression-molded using a roll pressing machine and/or the like while being heated as necessary. In this case, compression-molding may be repeated several times.

Further, the anode 22 is fabricated by a procedure similar to that of the cathode 21 described above. An anode active material is mixed with an anode binder, an anode electric conductor, and/or the like as necessary to prepare an anode mixture, which is subsequently dispersed in an organic solvent or the like to form paste anode mixture slurry. Subsequently, both surfaces of the anode current collector 22A are coated with the anode mixture slurry, which is dried to form the anode active material layer 22B. Thereafter, the anode active material layer 22B is compression-molded as necessary.

Further, an electrolyte salt is dispersed in a solvent to prepare an electrolytic solution.

Finally, the secondary battery is assembled using the cathode 21 and the anode 22. The cathode lead 25 is attached to the cathode current collector 21A by a welding method and/or the like, and the anode lead 26 is attached to the anode current collector 22A by a welding method and/or the like. Subsequently, the cathode 21 and the anode 22 are layered with the separator 23 in between and are spirally wound, and the spirally wound electrode body 20 is thereby fabricated. Thereafter, the center pin 24 is inserted in the center of the spirally wound electrode body. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by a welding method and/or the like, and the end tip of the anode lead 26 is attached to the battery can 11 by a welding method and/or the like. Subsequently, the electrolytic solution is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Function and Effect of Secondary Battery]

According to the cylindrical-type secondary battery, the cathode 21 contains the lithium phosphate compound as a cathode active material, and the foregoing three conditions are satisfied with regard to the fine pores or the voids of the cathode 21. In this case, permeability of the electrolytic solution with respect to the cathode 21 is improved, and electron conductivity and ion conductivity of the cathode 21 are improved. Therefore, the permeability of the electrolytic solution is secured and the electron conductivity and the ion conductivity are also secured, and therefore, superior battery characteristics are obtainable.

[1-2. Lithium Ion Secondary Battery (Laminated Film Type)]

Figure 3:
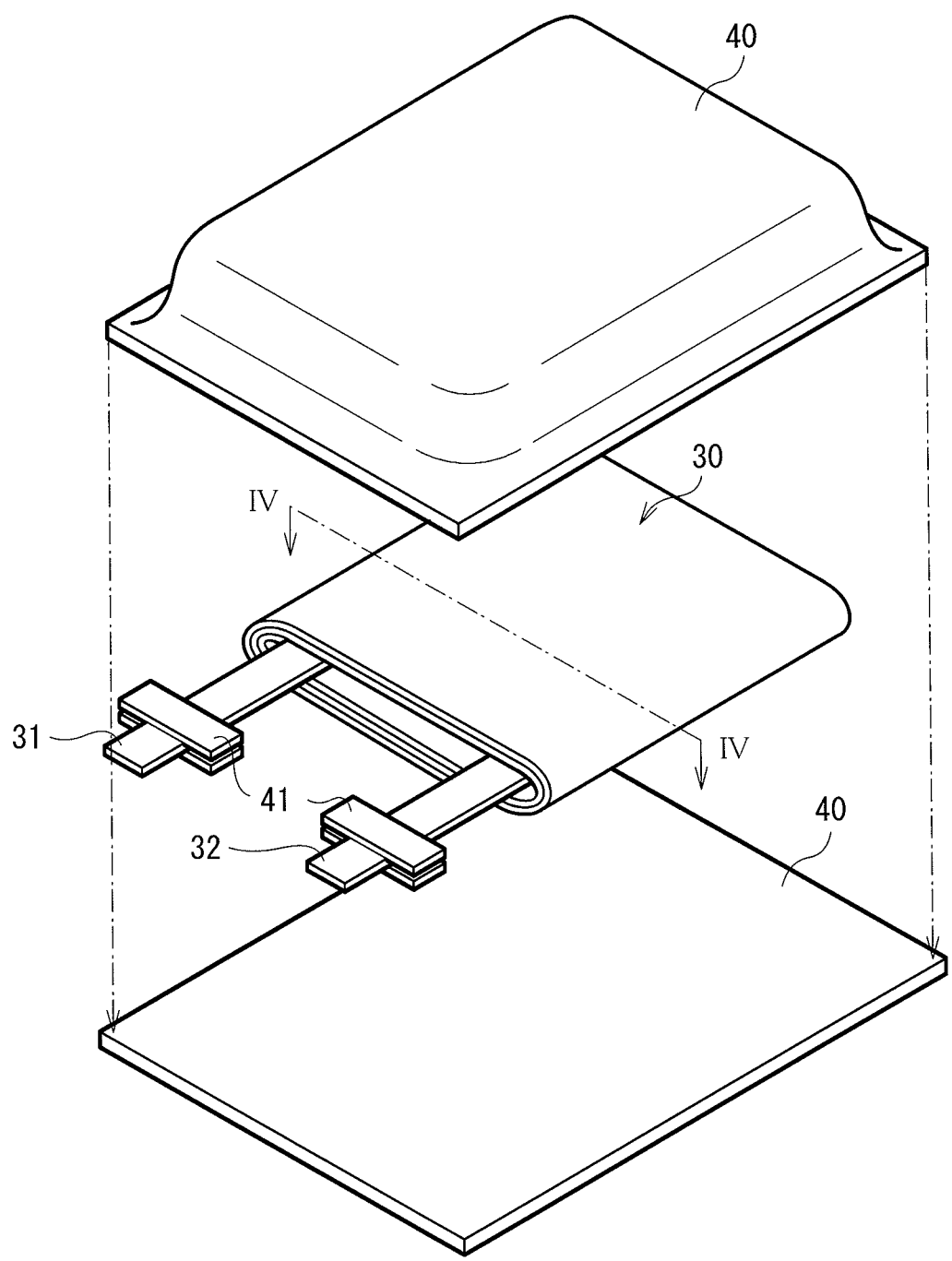
FIG. 3 is a perspective view illustrating a configuration of another secondary battery (laminated film type) including the electrode according to the embodiment of the present application.
Figure 4:
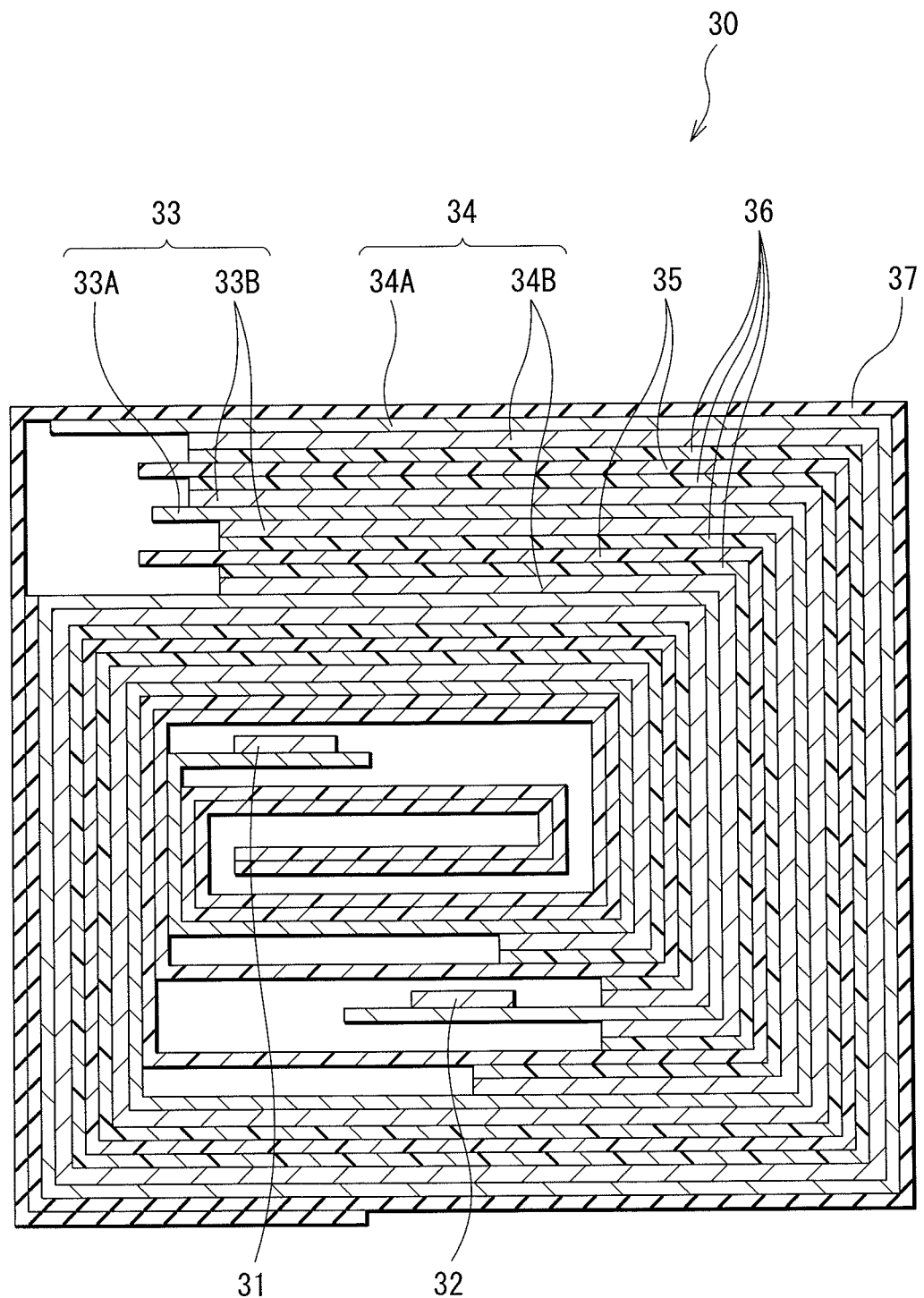
FIG. 4 is a cross-sectional view taken along a line IV-IV of a spirally wound electrode body illustrated in FIG. 3.

FIG. 3 illustrates an exploded perspective configuration of another secondary battery using the electrode according to the embodiment of the present application. FIG. 4 illustrates an enlarged cross-section taken along a line IV-IV of a spirally wound electrode body 30 illustrated in FIG. 3. In this case, the above-described electrode according to the embodiment of the present application may be used as a cathode 33, for example. In the following description, the elements of the cylindrical-type secondary battery described above will be used as necessary.

[Whole Configuration of Secondary Battery]

The secondary battery described here may be a so-called laminated-film-type lithium ion secondary battery. In the secondary battery, the spirally wound electrode body 30 is contained in a film-like outer package member 40. In the spirally wound electrode body 30, a cathode 33 and an anode 34 are layered with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made of, for example, an electrically-conductive material such as aluminum, and the anode lead 32 may be made of, for example, an electrically-conducive material such as copper, nickel, and stainless steel. These electrically-conductive materials are in the shape of, for example, a thin plate or mesh.

The outer package member 40 may be a laminated film in which, for example, a fusion bonding layer, a metal layer, and a surface protective layer are laminated in this order. In the laminated film, for example, the respective outer edges of the fusion bonding layers of two films are bonded to each other by fusion bonding, so that the fusion bonding layers and the spirally wound electrode body 30 are opposed to each other. However, the two films may be attached to each other by an adhesive, or the like. Examples of the fusion bonding layer may include a film made of polyethylene, polypropylene, or the like. Examples of the metal layer may include an aluminum foil. Examples of the surface protective layer may include a film made of nylon, polyethylene terephthalate, or the like.

In particular, the outer package member 40 may preferably be an aluminum laminated film in which a polyethylene film, an aluminum foil, and a nylon film are laminated in this order. However, the outer package member 40 may be a laminated film having other laminated structure, a polymer film such as polypropylene, or a metal film.

An adhesive film 41 to prevent outside air intrusion is inserted between the outer package member 40 and the cathode lead 31 and between the outer package member 40 and the anode lead 32. The adhesive film 41 is made of a material having adhesion characteristics with respect to the cathode lead 31 and the anode lead 32. Examples of the material having adhesion characteristics may include a polyolefin resin such as polyethylene, polypropylene, modified polyethylene, and modified polypropylene.

The cathode 33 may have, for example, a cathode active material layer 33B on a single surface or both surfaces of a cathode current collector 33A. The anode 34 may have, for example, an anode active material layer 34B on a single surface or both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively.

That is, the cathode active material layer 33B of the cathode 33 contains the lithium phosphate compound as a cathode active material, and the cathode 33 satisfies the foregoing three conditions with regard to the fine pores or the voids. Further, the configuration of the separator 35 is similar to the configuration of the separator 23.

In the electrolyte layer 36, electrolytic solution is held by a polymer compound. The electrolyte layer 36 is a so-called gel electrolyte, since thereby, high ion conductivity (for example, 1 mS/cm or more at room temperature) is obtained and liquid leakage of the electrolytic solution is prevented. The electrolyte layer 36 may contain other material such as an additive as necessary.

Examples of the polymer compounds may include one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, and a copolymer of vinylidene fluoride and hexafluoro propylene. In particular, polyvinylidene fluoride or the copolymer of vinylidene fluoride and hexafluoro propylene is preferable, and polyvinylidene fluoride is more preferable, since such a polymer compound is electrochemically stable.

The composition of the electrolytic solution is similar to the composition of the electrolytic solution of the cylindrical-type secondary battery. However, in the electrolyte layer 36 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

In the secondary battery, for example, at the time of charge, lithium ions extracted from the cathode 33 may be inserted in the anode 34 through the electrolyte layer 36. On the other hand, at the time of discharge, lithium ions extracted from the anode 34 may be inserted in the cathode 33 through the electrolyte layer 36.

[Method of Manufacturing Secondary Battery]

The secondary battery including the gel electrolyte layer 36 may be manufactured, for example, by the following three types of procedures.

In the first procedure, the cathode 33 and the anode 34 are fabricated by a fabrication procedure similar to that of the cathode 21 and the anode 22. In this case, the cathode 33 is fabricated by forming the cathode active material layer 33B on a single surface or both surfaces of the cathode current collector 33A, and the anode 34 is fabricated by forming the anode active material layer 34B on a single surface or both surfaces of the anode current collector 34A. Subsequently, a precursor solution containing an electrolytic solution, a polymer compound, and a solvent such as an organic solvent is prepared. Thereafter, the cathode 33 and the anode 34 are coated with the precursor solution to form the gel electrolyte layer 36. Subsequently, the cathode lead 31 is attached to the cathode current collector 33A by a welding method and/or the like and the anode lead 32 is attached to the anode current collector 34A by a welding method and/or the like. Subsequently, the cathode 33 and the anode 34 are layered with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded by a thermal fusion bonding method and/or the like to enclose the spirally wound electrode body 30 into the outer package members 40. In this case, the adhesive films 41 are inserted between the cathode lead 31 and the outer package member 40 and between the anode lead 32 and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is sandwiched between two pieces of the film-like outer package members 40, the outermost peripheries except for one side are bonded by a thermal fusion bonding method and/or the like, and the spirally wound body is contained in the pouch-like outer package member 40. Subsequently, a composition for electrolyte containing an electrolytic solution, a monomer as a raw material for the polymer compound, a polymerization initiator, and other materials such as a polymerization inhibitor as necessary is prepared, which is injected into the pouch-like outer package member 40. Thereafter, the outer package member 40 is hermetically sealed by a thermal fusion bonding method and/or the like. Subsequently, the monomer is thermally polymerized, and thereby, a polymer compound is formed. Accordingly, the gel electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated may include a polymer (a homopolymer, a copolymer, or a multicomponent copolymer) containing vinylidene fluoride as a component. Specific examples thereof include polyvinylidene fluoride, a binary copolymer containing vinylidene fluoride and hexafluoro propylene as components, and a ternary copolymer containing vinylidene fluoride, hexafluoro propylene, and chlorotrifluoroethylene as components. In addition to the polymer containing vinylidene fluoride as a component, other one or more polymer compounds may be used. Subsequently, an electrolytic solution is prepared and injected into the outer package member 40. Thereafter, the opening of the outer package member 40 is hermetically sealed by a thermal fusion bonding method and/or the like. Subsequently, the resultant is heated while a weight is applied to the outer package member 40, and the separator 35 is adhered to the cathode 33 and the anode 34 with the polymer compound in between. Thereby, the polymer compound is impregnated with the electrolytic solution, and accordingly, the polymer compound is gelated to form the electrolyte layer 36.

In the third procedure, swollenness of the secondary battery is suppressed more than in the first procedure. Further, in the third procedure, the monomer as a raw material of the polymer compound, the solvent, and the like are less likely to be left in the electrolyte layer 36 compared to in the second procedure. Therefore, the formation step of the polymer compound is favorably controlled. Therefore, sufficient adhesion characteristics are obtained between the cathode 33, the anode 34, and the separator 35, and the electrolyte layer 36.

[Function and Effect of Secondary Battery]

According to the laminated-film-type lithium ion secondary battery, since the cathode 33 contains the lithium phosphate compound as a cathode active material, and the cathode 33 satisfies the foregoing three conditions with regard to the fine pores or the voids. Therefore, superior battery characteristics are obtainable for a reason similar to that of the cylindrical-type secondary battery.

[1-3. Lithium Metal Secondary Battery (Cylindrical Type and Laminated Film Type)]

A secondary battery described here is a lithium secondary battery (lithium metal secondary battery) in which the capacity of the anode 22 is represented by precipitation and dissolution of lithium metal. The secondary battery has a configuration similar to that of the foregoing lithium ion secondary battery (cylindrical type), and is manufactured by a procedure similar to that of the foregoing lithium ion secondary battery (cylindrical type), except that the anode active material layer 22B is formed of the lithium metal.

In the secondary battery, the lithium metal is used as an anode active material, and thereby, higher energy density is obtainable. The anode active material layer 22B may exist at the time of assembling, or the anode active material layer 22B does not necessarily exist at the time of assembling and may be configured of the lithium metal precipitated at the time of charge. Further, the anode active material layer 22B may be used as a current collector as well, and the anode current collector 22A may be omitted.

In the secondary battery, for example, at the time of charge, lithium ions discharged from the cathode 21 are precipitated as the lithium metal on the surface of the anode current collector 22A through the electrolytic solution. Further, for example, at the time of discharge, the lithium metal is eluded as lithium ions from the anode active material layer 22B, and is inserted in the cathode 21 through the electrolytic solution.

According to the lithium metal secondary battery, the cathode 21 contains the lithium phosphate compound as a cathode active material, and the cathode 21 satisfies the foregoing three conditions with regard to the fine pores or the voids. Therefore, superior battery characteristics are obtainable for a reason similar to that of the lithium ion secondary battery. Other functions and other effects are similar to those of the cylindrical-type lithium ion secondary battery. It is to be noted that the foregoing lithium metal secondary battery is not limited to the cylindrical-type secondary battery, and may be a laminated-film-type secondary battery. In this case, similar effects are obtainable.

[2. Applications of Secondary Battery]

Next, a description will be given of application examples of the foregoing secondary battery.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power storage, or the like. The secondary battery used as an electric power source may be a main electric power source (electric power source used preferentially), or may be an auxiliary electric power source (electric power source used instead of a main electric power source or used being switched from the main electric power source). In the latter case, the main electric power source type is not limited to the secondary battery.

Examples of applications of the secondary battery may include electronic apparatuses (including portable electronic apparatuses) such as a video camcoder, a digital still camera, a mobile phone, a notebook personal computer, a cordless phone, a headphone stereo, a portable radio, a portable television, and a personal digital assistant. Further examples thereof may include a mobile lifestyle electric appliance such as an electric shaver; a memory device such as a backup electric power source and a memory card; an electric power tool such as an electric drill and an electric saw; a battery pack used as an electric power source of a notebook personal computer or the like; a medical electronic apparatus such as a pacemaker and a hearing aid; an electric vehicle such as an electric automobile (including a hybrid automobile); and an electric power storage system such as a home battery system for storing electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, or the like. One reason for this is that, in these applications, since superior battery characteristics are demanded, performance is effectively improved by using the secondary battery according to the embodiment of the present application. It is to be noted that the battery pack is an electric power source using a secondary battery, and is a so-called assembled battery or the like. The electric vehicle is a vehicle that works (runs) by using a secondary battery as a driving electric power source. As described above, the electric vehicle may be an automobile (such as a hybrid automobile) including a drive source other than a secondary battery. The electric power storage system is a system using a secondary battery as an electric power storage source. For example, in a home electric power storage system, electric power is stored in the secondary battery as an electric power storage source, and the electric power is consumed as necessary. Thereby, home electric products and the like become usable. The electric power tool is a tool in which a movable section (such as a drill) is moved using a secondary battery as a driving electric power source. The electronic apparatus is an apparatus executing various functions by using a secondary battery as a driving electric power source (electric power supply source).

A description will be specifically given of some application examples of the secondary battery. The configurations of the respective application examples explained below are merely examples, and may be changed as appropriate.

[2-1. Battery Pack]

Figure 5:
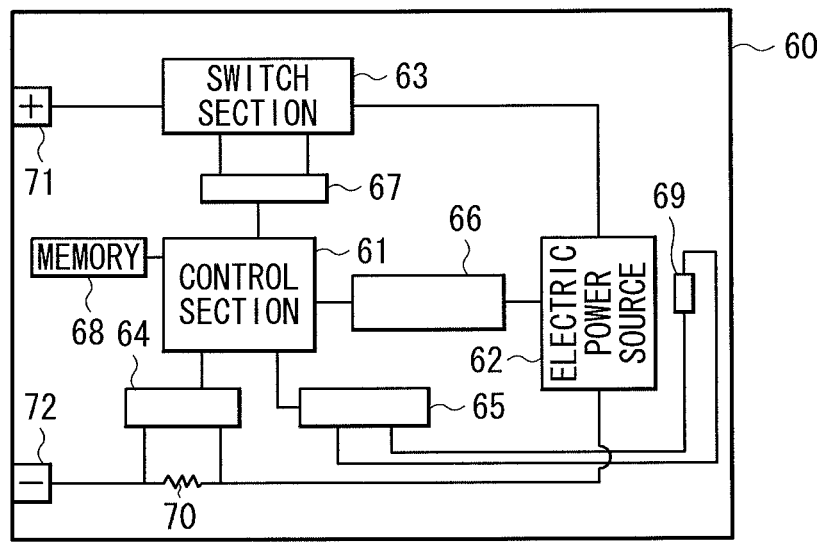
FIG. 5 is a block diagram illustrating a configuration of an application example (battery pack) of the secondary battery.

FIG. 5 illustrates a block configuration of a battery pack. For example, as illustrated in FIG. 5, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60 made of a plastic material and/or the like.

The control section 61 controls operation of the whole battery pack (including a used state of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. Connection type thereof may be a series-connected type, may be a parallel-connected type, or a mixed type thereof. As an example, the electric power source 62 may include six secondary batteries connected in a manner of dual-parallel and three-series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion (A/D conversion) on the measured voltage, and supplies the resultant to the control section 61.

The switch control section 67 controls operations of the switch section 63 according to signals inputted from the current measurement section 64 and the voltage measurement section 66.

The switch control section 67 executes control so that a charge current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charge current.

Further, the switch control section 67 executes control so that a discharge current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. For example, in the case where a large current flows at the time of discharge, the switch control section 67 blocks the discharge current.

It is to be noted that, in the secondary battery, for example, the overcharge detection voltage may be 4.20 V±0.05 V, and the over-discharge detection voltage may be 2.4 V±0.1 V.

The memory 68 may be, for example, an EEPROM as a nonvolatile memory or the like. The memory 68 may store, for example, numerical values calculated by the control section 61 and information of the secondary battery measured in a manufacturing step (such as an internal resistance in the initial state). It is to be noted that, in the case where the memory 68 stores a full charge capacity of the secondary battery, the control section 61 is allowed to comprehend information such as a remaining capacity.

The temperature detection device 69 measures temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven using the battery pack or an external device (such as a battery charger) used for charging the battery pack. The electric power source 62 is charged and discharged through the cathode terminal 71 and the anode terminal 72.

[2-2. Electric Vehicle]

Figure 6:
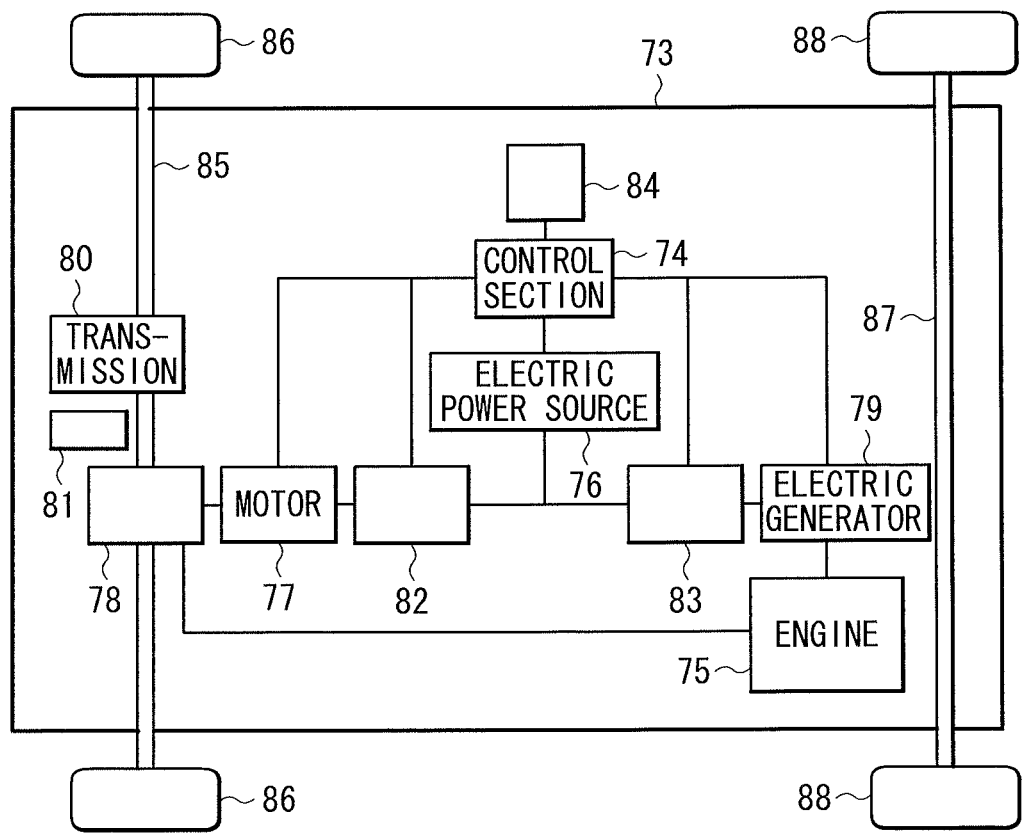
FIG. 6 is a block diagram illustrating a configuration of an application example (electric vehicle) of the secondary battery.

FIG. 6 illustrates a block configuration of a hybrid automobile as an example of electric vehicles. For example, as illustrated in FIG. 6, the electric vehicle may include a control section 74, an engine 75, an electric power source 76, a driving motor 77, a differential 78, an electric generator 79, a transmission 80, a clutch 81, inverters 82 and 83, and various sensors 84 in a housing 73 made of metal. In addition thereto, the electric vehicle may include, for example, a front drive shaft 85 and a front tire 86 that are connected to the differential 78 and the transmission 80, a rear drive shaft 87, and a rear tire 88.

The electric vehicle is runnable by using one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. The torque of the engine 75 may also be transferred to the electric generator 79. Due to the torque, the electric generator 79 generates alternating-current electric power. The alternating-current electric power is converted into direct-current electric power through the inverter 83, and the converted power is stored in the electric power source 76. On the other hand, in the case where the motor 77 as a conversion section is used as a power source, electric power (direct-current electric power) supplied from the electric power source 76 is converted into alternating-current electric power through the inverter 82. The motor 77 may be driven by the alternating-current electric power. Drive power (torque) obtained by converting the electric power by the motor 77 is transferred to the front tire 86 or the rear tire 88 through the differential 78, the transmission 80, and the clutch 81 as the drive sections, for example.

It is to be noted that, alternatively, the following mechanism may be adopted. In the mechanism, when speed of the electric vehicle is reduced by an unillustrated brake mechanism, the resistance at the time of speed reduction is transferred to the motor 77 as torque, and the motor 77 generates alternating-current electric power by the torque. It is preferable that the alternating-current electric power be converted to direct-current electric power through the inverter 82, and the direct-current regenerative electric power be stored in the electric power source 76.

The control section 74 controls operations of the whole electric vehicle, and, for example, may include a CPU and/or the like. The electric power source 76 includes one or more secondary batteries (not illustrated). Alternatively, the electric power source 76 may be connected to an external electric power source, and electric power may be stored by receiving the electric power from the external electric power source. The various sensors 84 may be used, for example, for controlling the number of revolutions of the engine 75 or for controlling opening level (throttle opening level) of an unillustrated throttle valve. The various sensors 84 may include, for example, a speed sensor, an acceleration sensor, an engine frequency sensor, and/or the like.

The description has been given above of the hybrid automobile as an electric vehicle. However, examples of the electric vehicles may include a vehicle (electric automobile)

working by using only the electric power source 76 and the motor 77 without using the engine 75.

[2-3. Electric Power Storage System]

Figure 7:
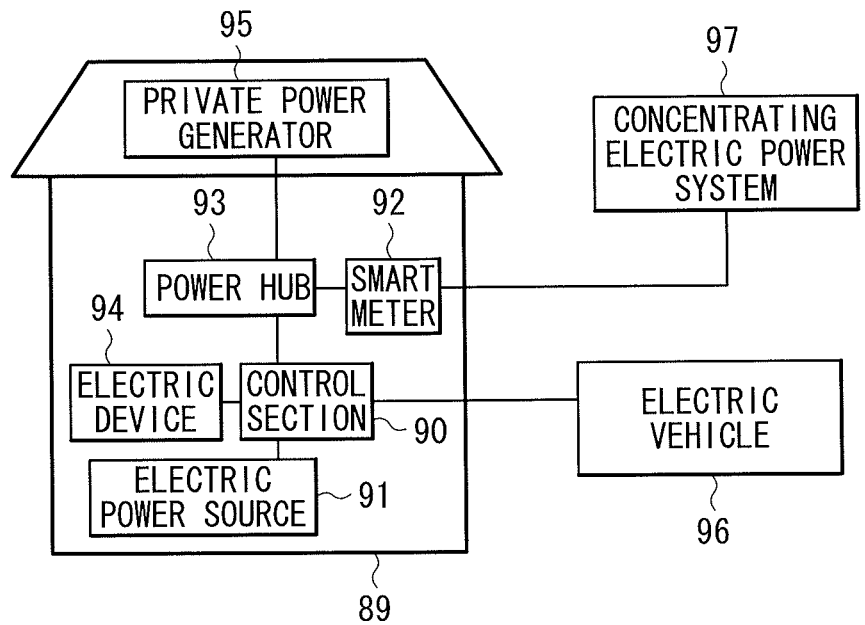
FIG. 7 is a block diagram illustrating a configuration of an application example (electric power storage system) of the secondary battery.

FIG. 7 illustrates a block configuration of an electric power storage system. For example, as illustrated in FIG. 7, the electric power storage system may include a control section 90, an electric power source 91, a smart meter 92, and a power hub 93 inside a house 89 such as a general residence and a commercial building.

In this case, the electric power source 91 may be connected to, for example, an electric device 94 arranged inside the house 89, and may be connectable to an electric vehicle 96 parked outside the house 89. Further, for example, the electric power source 91 may be connected to a private power generator 95 arranged inside the house 89 through the power hub 93, and may be connectable to an external concentrating electric power system 97 through the smart meter 92 and the power hub 93.

It is to be noted that the electric device 94 may include, for example, one or more home electric appliances such as a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls operation of the whole electric power storage system (including a used state of the electric power source 91), and, for example, may include a CPU and/or the like. The electric power source 91 includes one or more secondary batteries (not illustrated). The smart meter 92 may be, for example, an electric power meter compatible with a network arranged in the house 89 demanding electric power, and may be communicable with an electric power supplier. Accordingly, for example, while the smart meter 92 communicates with outside as necessary, the smart meter 92 controls the balance between supply and demand in the house 89 and allows effective and stable energy supply.

In the electric power storage system, for example, electric power may be stored in the electric power source 91 from the concentrating electric power system 97 as an external electric power source through the smart meter 92 and the power hub 93, and electric power may be stored in the electric power source 91 from the private power generator 95 as an independent electric power source through the power hub 93. As necessary, the electric power stored in the electric power source 91 is supplied to the electric device 94 or to the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 with the use of the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

The foregoing electric power storage system may be arranged for each household (family unit), or may be arranged for a plurality of households (family units).

[2-4. Electric Power Tool]

Figure 8:
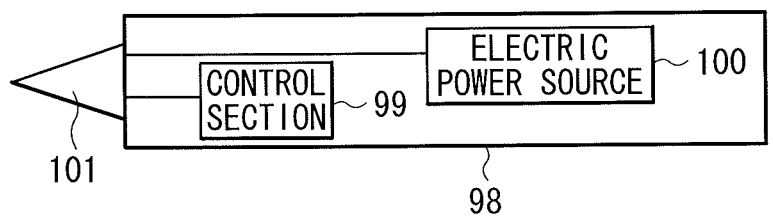
FIG. 8 is a block diagram illustrating a configuration of an application example (electric power tool) of the secondary battery.

FIG. 8 illustrates a block configuration of an electric power tool. For example, as illustrated in FIG. 8, the electric power tool may be an electric drill, and may include a control section 99 and an electric power source 100 in a tool body 98 made of a plastic material and/or the like. For example, a drill section 101 as a movable section may be attached to the tool body 98 in an operable (rotatable) manner.

The control section 99 controls operations of the whole electric power tool (including a used state of the electric power source 100), and may include, for example, a CPU and/or the like. The electric power source 100 includes one or more secondary batteries (not illustrated). The control section 99 allows electric power to be supplied from the electric power source 100 to the drill section 101 as necessary according to operation of an unillustrated operation switch to operate the drill section 101.

EXAMPLES

Specific Examples according to the embodiment of the present application will be described in detail.

Examples 1 to 46

The cylindrical-type lithium ion secondary battery illustrated in FIG. 1 and FIG. 2 was fabricated by the following procedure.

Upon fabricating the cathode 21, first, 91 parts by mass of a cathode active material (lithium phosphate compound), 5 parts by mass of a cathode binder (polyvinylidene fluoride (PVDF)), and 4 parts by mass of a cathode electric conductor (acetylene black) were mixed to obtain a cathode mixture. Compositions of the lithium phosphate compound are as illustrated in Tables 1 and 2. Subsequently, the cathode mixture was dispersed in an organic solvent (N-methyl-2-pyrrolidone: NMP) to obtain paste cathode mixture slurry. Subsequently, both surfaces of the cathode current collector 21A in the shape of a strip (aluminum foil being 15 μm thick) were coated with the cathode mixture slurry uniformly with the use of a coating device, which was dried to form the cathode active material layer 21B. Finally, the cathode active material layer 21B was compression-molded using a roll pressing machine. Upon forming the cathode active material layer 21B, configuration conditions of the cathode active material layer 21B were adjusted as illustrated in Tables 1 and 2 by changing, for example, the average particle diameter (D50) of the cathode active material (primary particles and secondary particles), the press pressure of the cathode active material layer 21B, and/or the like. The configuration conditions referred to positions (pore diameters: μm) of the peaks P1 and P2 obtained by fine pore distribution of the cathode active material layer 21B, the intensity ratio I2/I1, and the porosity (%) calculated from the density of the cathode active material layer 21B and the true density of the constituent material. For measuring the fine pore distribution, AutoPore IV9500 available from Shimadzu Corporation was used as a mercury porosimeter. It is to be noted that the cathode 21 used for measuring the fine pore distribution was in a state of not being charged or discharged.

Upon fabricating the anode 22, first, 95 parts by mass of an anode active material (graphite) and 5 parts by mass of an anode binder (PVDF) were mixed to obtain an anode mixture. Subsequently, the anode mixture was dispersed in an organic solvent (NMP) to obtain paste anode mixture slurry. Subsequently, both surfaces of the anode current collector 22A in the shape of a strip (copper foil being 15 μm thick) were coated with the anode mixture slurry uniformly using a coating device, which was dried to form the anode active material layer 22B. Finally, the anode active material layer 22B was compression-molded using a roll pressing machine.

Upon preparing an electrolytic solution, an electrolyte salt ($LiPF_6$) was dissolved in a solvent (ethylene carbonate (EC) and dimethyl carbonate (DMC)). In this case, the composition of the solvent was EC:DMC=50:50 at a weight ratio, and the content of the electrolyte salt with respect to the solvent was 1 mol/$dm^3$ (=1 mol/l).

Upon assembling the secondary battery, first, the cathode lead 25 made of aluminum was welded to the cathode current collector 21A, and the anode lead 26 made of nickel was welded to the anode current collector 22A. Subsequently, the cathode 21 and the anode 22 were layered with the separator 23 (microporous polypropylene film being 25 μm thick) in between and were spirally wound. Thereafter, the winding end section was fixed using an adhesive tape to fabricate the spirally wound electrode body 20. Subsequently, the center pin 24 was inserted in the center of the spirally wound electrode body 20. Subsequently, while the spirally wound electrode body 20 was sandwiched between the pair of insulating plates 12 and 13, the spirally wound electrode body 20 was contained in the battery can 11 made of iron plated with nickel. In this case, one end of the cathode lead 25 was welded to the safety valve mechanism 15, and one end of the anode lead 26 was welded to the battery can 11. Subsequently, the electrolytic solution was injected into the battery can 11 by a depressurization method, and the separator 23 was impregnated with the electrolytic solution. Finally, at the open end of the battery can 11, the battery cover 14, the safety valve mechanism 15, and the PTC device 16 were fixed by being swaged with the gasket 17. The cylindrical-type secondary battery was thereby completed. Upon fabricating the secondary battery, lithium metal was prevented from being precipitated on the anode 22 at the time of full charge by adjusting the thickness of the cathode active material layer 21B.

Cycle characteristics of the secondary battery were examined, and results illustrated in Tables 1 and 2 were obtained. In examining the cycle characteristics, one cycle of charge and discharge was performed on the secondary battery in the thermostatic bath (23 deg C.) to measure a discharge capacity. Subsequently, the secondary battery was repeatedly charged and discharged until the total number of cycles reached 500 in the same environment, and a discharge capacity was measured. From these results, capacity retention ratio (%)=(discharge capacity at the 500th cycle/discharge capacity at the first cycle)×100 was calculated. At the time of charge, charge was performed at a constant current of 1 A until the battery voltage reached 4.2 V, and thereafter, charge was performed at a constant voltage. At the time of discharge, discharge was performed at a constant current of 10 A until the battery voltage reached 2.0 V.

TABLE 1

| Example | Cathode active material (lithium phosphate compound) | Pore diameter (μm) P1 | Pore diameter (μm) P2 | Intensity ratio I2/I1 | Porosity (%) | Capacity retention ratio (%) |
|---|---|---|---|---|---|---|
| 1 | $LiFePO_4$ | 0.08 | 0.50 | 7.0 | 40 | 90 |
| 2 | | 0.06 | 0.32 | 4.0 | 40 | 87 |
| 3 | | 0.14 | 0.90 | 0.5 | 50 | 82 |
| 4 | | 0.14 | 0.90 | 7.0 | 50 | 84 |
| 5 | | 0.14 | 0.90 | 18.0 | 50 | 83 |
| 6 | | 0.14 | 0.90 | 9.0 | 40 | 85 |
| 7 | | 0.14 | 0.90 | 7.0 | 30 | 83 |
| 8 | | 0.14 | 0.50 | 9.0 | 35 | 86 |
| 9 | | 0.05 | 0.90 | 9.0 | 40 | 83 |
| 10 | | 0.01 | 0.15 | 20.0 | 30 | 81 |
| 11 | | 0.01 | 0.15 | 10.0 | 30 | 83 |
| 12 | | 0.01 | 0.15 | 3.0 | 30 | 81 |
| 13 | | 0.01 | 0.30 | 10.0 | 30 | 82 |
| 14 | | 0.01 | 0.30 | 10.0 | 35 | 85 |
| 15 | | 0.02 | 0.35 | 6.0 | 45 | 88 |
| 16 | | 0.04 | 0.18 | 14.5 | 35 | 86 |
| 17 | | 0.10 | 0.65 | 2.0 | 45 | 86 |
| 18 | $LiFe_{0.25}Mn_{0.75}PO_4$ | 0.08 | 0.30 | 7.0 | 40 | 85 |
| 19 | $LiFe_{0.50}Mn_{0.50}PO_4$ | 0.08 | 0.30 | 7.0 | 40 | 88 |
| 20 | $LiFe_{0.90}Mg_{0.10}PO_4$ | 0.08 | 0.30 | 7.0 | 40 | 85 |
| 21 | $LiFe_{0.90}Nb_{0.10}PO_4$ | 0.08 | 0.30 | 7.0 | 40 | 87 |

TABLE 2

| Example | Cathode active material (lithium phosphate compound) | Pore diameter (μm) P1 | Pore diameter (μm) P2 | Intensity ratio I2/I1 | Porosity (%) | Capacity retention ratio (%) |
|---|---|---|---|---|---|---|
| 22 | $LiFePO_4$ | — | 0.35 | — | 40 | 70 |
| 23 | | — | 0.50 | — | 55 | 67 |
| 24 | | — | 0.08 | — | 45 | 23 |
| 25 | | 0.09 | 0.34 | 15.0 | 55 | 68 |
| 26 | | 0.06 | 0.21 | 3.0 | 25 | 65 |
| 27 | | 0.02 | 0.12 | 7.0 | 40 | 62 |

TABLE 2-continued

| Example | Cathode active material (lithium phosphate compound) | Pore diameter (μm) P1 | Pore diameter (μm) P2 | Intensity ratio I2/I1 | Porosity (%) | Capacity retention ratio (%) |
|---|---|---|---|---|---|---|
| 28 |  | 0.21 | 0.75 | 25.0 | 60 | 55 |
| 29 |  | 0.18 | 0.65 | 18.0 | 45 | 62 |
| 30 |  | 0.14 | 1.03 | 15.0 | 45 | 68 |
| 31 |  | 0.005 | 0.18 | 3.0 | 40 | 58 |
| 32 |  | 0.04 | 0.35 | 0.1 | 40 | 55 |
| 33 |  | 0.07 | 0.40 | 25.0 | 35 | 68 |
| 34 | $LiFe_{0.25}Mn_{0.75}PO_4$ | 0.18 | 0.65 | 18.0 | 45 | 56 |
| 35 |  | 0.04 | 0.35 | 0.1 | 40 | 51 |
| 36 |  | 0.07 | 0.40 | 25.0 | 35 | 63 |
| 37 |  | 0.005 | 0.18 | 3.0 | 40 | 47 |
| 38 |  | 0.02 | 0.12 | 7.0 | 40 | 53 |
| 39 |  | 0.14 | 1.03 | 15.0 | 45 | 60 |
| 40 |  | 0.09 | 0.34 | 15.0 | 55 | 58 |
| 41 |  | 0.06 | 0.21 | 3.0 | 25 | 51 |
| 42 |  | 0.005 | 0.18 | 3.0 | 40 | 52 |
| 43 |  | 0.09 | 0.34 | 15.0 | 55 | 61 |
| 44 |  | 0.06 | 0.21 | 3.0 | 25 | 58 |
| 45 | $LiFe_{0.90}Mg_{0.10}PO_4$ | 0.02 | 0.12 | 7.0 | 40 | 56 |
| 46 | $LiFe_{0.90}Nb_{0.10}PO_4$ | 0.14 | 1.03 | 15.0 | 45 | 60 |

In the case where the lithium phosphate compound was used as a cathode active material, if the three conditions with regard to the fine pores or the voids of the cathode 21 were satisfied (Examples 1 to 21), the capacity retention ratios were increased compared to in the case where the conditions were not satisfied (Examples 22 to 46). Of the three conditions, the first condition refers to that the pore diameter of the peak P1 is equal to or more than 0.01 μm and less than 0.15 μm, and the pore diameter of the peak P2 is from 0.15 μm to 0.9 μm both inclusive. The second condition refers to that the intensity ratio I2/I1 is from 0.5 to 20 both inclusive. The third condition refers to that the porosity is from 30% to 50% both inclusive. From the foregoing result, in the case where the foregoing three conditions were satisfied, the cycle characteristics were improved, and thereby, superior battery characteristics were obtained.

The present application has been described above referring to the preferred embodiment and Examples. However, the present application is not limited to the examples described in the preferred embodiment and Examples and may be variously modified. For example, the electrode of the present application may be applied to other applications such as a capacitor.

Further, for example, the description has been given with the specific examples of the case in which the battery structure is the cylindrical type or the laminated film type, and the battery device has the spirally wound structure. However, applicable structures are not limited thereto. The secondary battery of the present application is similarly applicable to a battery having other battery structure such as a square-type battery, a coin-type battery, and a button-type battery, or a battery in which the battery device has other structure such as a laminated structure.

Further, the description has been given of the case using Li as an electrode reactant. However, the electrode reactant is not necessarily limited thereto. As an electrode reactant, for example, other Group 1 element such as Na and K, a Group 2 element such as Mg and Ca, or other light metal such as Al may be used. The effect of the present application may be obtained without depending on the electrode reactant type, and therefore, even if the electrode reactant type is changed, a similar effect is obtainable.

Further, in the embodiment and Examples, the description has been given of the appropriate ranges derived from the result of Examples for the positions (pore diameter ranges) of the peaks P1 and P2. However, the description does not totally deny a possibility that the pore diameter ranges become out of the foregoing ranges. That is, the foregoing appropriate ranges are particularly preferable ranges to obtain the effect of the present application. Therefore, as long as the effect of the present application is obtainable, the pore diameter ranges may be out of the foregoing pore diameter ranges in some degree. The same is similarly applicable to the intensity ratio I2/I1 and the porosity.

It is possible to achieve at least the following configurations from the above-described exemplary embodiment and the modifications of the disclosure.

(1) A secondary battery including:
    a cathode;
    an anode; and
    an electrolytic solution, wherein
    (A) the cathode includes a cathode active material, and the cathode active material includes a lithium phosphate compound represented by a following Formula (1),
    (B) fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive,
    (C) a ratio I2/I1 between intensity I1 of the peak P1 and intensity I2 of the peak P2 is from about 0.5 to about 20 both inclusive, and
    (D) porosity of the cathode is from about 30 percent to about 50 percent both inclusive, $$Li_aM1_bPO_4 \quad (1)$$

where M1 is one or more of Fe, Mn, Mg, Ni, Co, Al, W, Nb, Ti, Si, Cr, Cu, and Zn; and a and b satisfy $0 \le a \le 2$ and $b \le 1$.

(2) The secondary battery according to (1), wherein the lithium phosphate compound is a compound represented by a following Formula (2), $$Li_cFe_dM2_ePO_4 \quad (2)$$

where M2 is one or more of Mn, Mg, Ni, Co, Al, W, Nb, Ti, Si, Cr, Cu, and Zn; and c, d, and e satisfy $0 \leq c \leq 2$, $0 < d \leq 1$, $0 \leq e < 1$, and $d+e \leq 1$.

(3) The secondary battery according to (1) or (2), wherein
the lithium phosphate compound includes secondary particles that are each an aggregate of a plurality of primary particles,
an average particle diameter (D50) of the primary particles is from about 0.05 micrometers to about 2 micrometers both inclusive, and an average particle diameter (D50) of the secondary particles is from about 1 micrometer to about 30 micrometers both inclusive.

(4) The secondary battery according to (3), wherein
an electrically-conductive layer is provided on part or all of surfaces of the primary particles, and
the electrically-conductive layer includes a carbon material.

(5) The secondary battery according to any one of (1) to (4), wherein
the cathode includes a cathode binder,
a content of the cathode active material is equal to or larger than about 80 weight percent with respect to a total content of the cathode active material and the cathode binder, and
a content of the cathode binder is equal to or less than about 20 weight percent with respect to the total content of the cathode active material and the cathode binder.

(6) The secondary battery according to any one of (1) to (4), wherein
the cathode includes a cathode binder and a cathode electric conductor,
a content of the cathode active material is equal to or larger than about 80 weight percent with respect to a total content of the cathode active material, the cathode binder, and the cathode electric conductor,
a content of the cathode binder is equal to or less than about 10 weight percent with respect to the total content of the cathode active material, the cathode binder, and the cathode electric conductor, and
a content of the cathode electric conductor is equal to or less than about 10 weight percent with respect to the total content of the cathode active material, the cathode binder, and the cathode electric conductor.

(7) The secondary battery according to any one of (1) to (6), wherein the secondary battery is a lithium secondary battery.

(8) An electrode including an active material, wherein
(A) the active material includes a lithium phosphate compound represented by a following Formula (1),
(B) fine pore distribution measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive,
(C) a ratio I2/I1 between intensity I1 of the peak P1 and intensity I2 of the peak P2 is from about 0.5 to about 20 both inclusive, and
(D) porosity is from about 30 percent to about 50 percent both inclusive, $$Li_aM1_bPO_4 \qquad (1)$$

where M1 is one or more of Fe, Mn, Mg, Ni, Co, Al, W, Nb, Ti, Si, Cr, Cu, and Zn; and a and b satisfy $0 \leq a \leq 2$ and $b \leq 1$.

(9) A battery pack including:
the secondary battery according to any one of (1) to (7);
a control section controlling a used state of the secondary battery; and
a switch section switching the used state of the secondary battery according to an instruction of the control section.

(10) An electric vehicle including:
the secondary battery according to any one of (1) to (7);
a conversion section converting electric power supplied from the secondary battery into drive power;
a drive section operating according to the drive power; and
a control section controlling a used state of the secondary battery.

(11) An electric power storage system including:
the secondary battery according to any one of (1) to (7);
one or more electric devices supplied with electric power from the secondary battery; and
a control section controlling the supplying of the electric power from the secondary battery to the one or more electric devices.

(12) An electric power tool including:
the secondary battery according to any one of (1) to (7); and
a movable section being supplied with electric power from the secondary battery.

(13) An electronic apparatus including the secondary battery according to any one of (1) to (7) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
a cathode;
an anode; and
an electrolytic solution, wherein:
(A) the cathode includes a cathode active material, and the cathode active material includes a lithium phosphate compound represented by a following Formula (1),
(B) fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive,
(C) a ratio I2/I1 between intensity I1 of the peak P1 and intensity I2 of the peak P2 is from about 0.5 to about 20 both inclusive, and
(D) porosity of the cathode is from about 30 percent to about 50 percent both inclusive, $$Li_aM1_bPO_4 \qquad (1),$$

where M1 is at least one selected from the group consisting of: Fe, Mn, Mg, Ni, Co, Al, W, Nb, Ti, Si, Cr, Cu, and Zn; and a and b satisfy $0 \leq a \leq 2$ and $b \leq 1$.

2. The secondary battery according to claim 1, wherein the lithium phosphate compound is a compound represented by a following Formula (2), $$Li_cFe_dM2_ePO_4 \qquad (2)$$

where M2 is at least one selected from the group consisting of: Mn, Mg, Ni, Co, Al, W, Nb, Ti, Si, Cr, Cu, and Zn; and c, d, and e satisfy $0 \leq c \leq 2$, $0 < d \leq 1$, $0 \leq e < 1$, and $d+e \leq 1$.

3. The secondary battery according to claim 1, wherein:
the lithium phosphate compound includes secondary particles that are each an aggregate of a plurality of primary particles,
an average particle diameter (D50) of the primary particles is from about 0.05 micrometers to about 2 micrometers both inclusive, and
an average particle diameter (D50) of the secondary particles is from about 1 micrometer to about 30 micrometers both inclusive.

4. The secondary battery according to claim 3, wherein:
an electrically-conductive layer is provided on at least part of surfaces of the primary particles, and
the electrically-conductive layer includes a carbon material.

5. The secondary battery according to claim 1, wherein:
the cathode includes a cathode binder,
a content of the cathode active material is at least about 80 weight percent with respect to a total content of the cathode active material and the cathode binder, and
a content of the cathode binder is less than or equal to about 20 weight percent with respect to the total content of the cathode active material and the cathode binder.

6. The secondary battery according to claim 1, wherein:
the cathode includes a cathode binder and a cathode electric conductor,
a content of the cathode active material is at least about 80 weight percent with respect to a total content of the cathode active material, the cathode binder, and the cathode electric conductor,
a content of the cathode binder is less than or equal to about 10 weight percent with respect to the total content of the cathode active material, the cathode binder, and the cathode electric conductor, and
a content of the cathode electric conductor is less than or equal to about 10 weight percent with respect to the total content of the cathode active material, the cathode binder, and the cathode electric conductor.

7. The secondary battery according to claim 1, wherein the secondary battery is a lithium ion secondary battery.

8. An electrode comprising an active material, wherein:
(A) the active material includes a lithium phosphate compound represented by a following Formula (1),
(B) fine pore distribution measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive,
(C) a ratio I2/I1 between intensity I1 of the peak P1 and intensity I2 of the peak P2 is from about 0.5 to about 20 both inclusive, and
(D) porosity is from about 30 percent to about 50 percent both inclusive, $$Li_a M1_b PO_4 \tag{1},$$

where M1 is at least one selected from the group consisting of: Fe, Mn, Mg, Ni, Co, Al, W, Nb, Ti, Si, Cr, Cu, and Zn; and a and b satisfy $0 \le a \le 2$ and $b \le 1$.

9. A battery pack comprising:
a secondary battery;
a control section configured to control a used state of the secondary battery; and
a switch section configured to switch the used state of the secondary battery according to an instruction of the control section, wherein:
the secondary battery includes: a cathode, an anode, and an electrolytic solution,
(A) the cathode includes a cathode active material, and the cathode active material includes a lithium phosphate compound represented by a following Formula (1),
(B) fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive,
(C) a ratio I2/I1 between intensity I1 of the peak P1 and intensity I2 of the peak P2 is from about 0.5 to about 20 both inclusive, and
(D) porosity of the cathode is from about 30 percent to about 50 percent both inclusive, $$Li_a M1_b PO_4 \tag{1},$$

where M1 is at least one selected from the group consisting of: Fe, Mn, Mg, Ni, Co, Al, W, Nb, Ti, Si, Cr, Cu, and Zn; and a and b satisfy $0 \le a \le 2$ and $b \le 1$.

10. An electric vehicle comprising:
a secondary battery;
a conversion section configured to convert electric power supplied from the secondary battery into drive power;
a drive section configured to operate according to the drive power; and
a control section configured to control a used state of the secondary battery, wherein:
the secondary battery includes a cathode, an anode, and an electrolytic solution,
(A) the cathode includes a cathode active material, and the cathode active material includes a lithium phosphate compound represented by a following Formula (1),
(B) fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive,
(C) a ratio I2/I1 between intensity I1 of the peak P1 and intensity I2 of the peak P2 is from about 0.5 to about 20 both inclusive, and
(D) porosity of the cathode is from about 30 percent to about 50 percent both inclusive, $$Li_a M1_b PO_4 \tag{1},$$

where M1 is at least one selected from the group consisting of: Fe, Mn, Mg, Ni, Co, Al, W, Nb, Ti, Si, Cr, Cu, and Zn; and a and b satisfy $0 \le a \le 2$ and $b \le 1$.

11. An electric power storage system comprising:
a secondary battery;
one or more electric devices supplied with electric power from the secondary battery; and
a control section configured to control the supplying of the electric power from the secondary battery to the one or more electric devices, wherein:
the secondary battery includes a cathode, an anode, and an electrolytic solution,
(A) the cathode includes a cathode active material, and the cathode active material includes a lithium phosphate compound represented by a following Formula (1),
(B) fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive, (C) a ratio I2/I1 between intensity I1 of the peak P1 and intensity I2 of the peak P2 is from about 0.5 to about 20 both inclusive, and (D) porosity of the cathode is from about 30 percent to about 50 percent both inclusive, $$Li_aM1_bPO_4 \qquad (1),$$

where M1 is at least one selected from the group consisting of: Fe, Mn, Mg, Ni, Co, Al, W, Nb, Ti, Si, Cr, Cu, and Zn; and a and b satisfy 0≤a≤2 and b≤1.

12. An electric power tool comprising:
a secondary battery; and
a movable section being supplied with electric power from the secondary battery, wherein:
the secondary battery includes a cathode, an anode, and an electrolytic solution,
(A) the cathode includes a cathode active material, and the cathode active material includes a lithium phosphate compound represented by a following Formula (1),
(B) fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive,
(C) a ratio I2/I1 between intensity I1 of the peak P1 and intensity I2 of the peak P2 is from about 0.5 to about 20 both inclusive, and
(D) porosity of the cathode is from about 30 percent to about 50 percent both inclusive, $$Li_aM1_bPO_4 \qquad (1),$$

where M1 is at least one selected from the group consisting of: Fe, Mn, Mg, Ni, Co, Al, W, Nb, Ti, Si, Cr, Cu, and Zn; and a and b satisfy 0≤a≤2 and b≤1.

13. An electronic apparatus comprising a secondary battery as an electric power supply source, wherein:
the secondary battery includes a cathode, an anode, and an electrolytic solution,
(A) the cathode includes a cathode active material, and the cathode active material includes a lithium phosphate compound represented by a following Formula (1),
(B) fine pore distribution of the cathode measured by a mercury intrusion method indicates a peak P1 in a range where a pore diameter is equal to or more than about 0.01 micrometers and less than about 0.15 micrometers, and indicates a peak P2 in a range where the pore diameter is from about 0.15 micrometers to about 0.9 micrometers both inclusive,
(C) a ratio I2/I1 between intensity I1 of the peak P1 and intensity I2 of the peak P2 is from about 0.5 to about 20 both inclusive, and
(D) porosity of the cathode is from about 30 percent to about 50 percent both inclusive, $$Li_aM1_bPO_4 \qquad (1),$$

where M1 is at least one selected from the group consisting of: Fe, Mn, Mg, Ni, Co, Al, W, Nb, Ti, Si, Cr, Cu, and Zn; and a and b satisfy 0≤a≤2 and b≤1.

* * * * *